(12) United States Patent
Tsai et al.

(10) Patent No.: US 8,786,964 B2
(45) Date of Patent: Jul. 22, 2014

(54) PHOTOGRAPHING LENS ASSEMBLY

(71) Applicant: Largan Precision Co., Ltd., Taichung (TW)

(72) Inventors: Tsung-Han Tsai, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 52 days.

(21) Appl. No.: 13/647,401

(22) Filed: Oct. 9, 2012

(65) Prior Publication Data

US 2013/0279025 A1    Oct. 24, 2013

(30) Foreign Application Priority Data

Apr. 20, 2012    (TW) .............................. 101114199 A

(51) Int. Cl.
| | | |
|---|---|---|
| *G02B 3/02* | (2006.01) | |
| *G02B 13/18* | (2006.01) | |
| *G02B 9/12* | (2006.01) | |
| *G02B 13/00* | (2006.01) | |

(52) U.S. Cl.
CPC ............ *G02B 13/0035* (2013.01); *G02B 13/18* (2013.01); *G02B 9/12* (2013.01)
USPC ............................ 359/716; 359/708; 359/784

(58) Field of Classification Search
USPC .................................. 359/784, 796, 797, 716
See application file for complete search history.

(56) References Cited

U.S. PATENT DOCUMENTS

| | | | | |
|---|---|---|---|---|
| 7,948,692 | B2 * | 5/2011 | Tang et al. ..................... | 359/784 |
| 8,199,418 | B2 * | 6/2012 | Chen et al. ..................... | 359/773 |
| 8,373,936 | B2 * | 2/2013 | Shigemitsu et al. .......... | 359/715 |
| 8,498,064 | B2 * | 7/2013 | Okano .......................... | 359/773 |
| 8,520,321 | B2 * | 8/2013 | Takei ........................... | 359/715 |
| 2010/0097709 | A1 * | 4/2010 | Tsai .............................. | 359/715 |
| 2010/0202065 | A1 * | 8/2010 | Tang et al. ..................... | 359/784 |
| 2011/0261471 | A1 * | 10/2011 | Taniyama ..................... | 359/715 |
| 2011/0279911 | A1 * | 11/2011 | Kubota et al. ................. | 359/716 |
| 2011/0310495 | A1 * | 12/2011 | You .............................. | 359/773 |
| 2013/0208171 | A1 * | 8/2013 | Lai ............................... | 348/340 |
| 2013/0301144 | A1 * | 11/2013 | Tsai et al. ...................... | 359/716 |

* cited by examiner

*Primary Examiner* — Thomas K Pham
*Assistant Examiner* — Nicholas Pasko
(74) *Attorney, Agent, or Firm* — CKC & Partners Co., Ltd.

(57) ABSTRACT

A photographing lens assembly includes, in order from an object side to an image side, a first lens element, a second lens element and a third lens element. The first lens element with positive refractive power has an object-side surface being convex at a paraxial region. The second lens element with negative refractive power has an object-side surface being concave at a paraxial region and an image-side surface being concave or planar at a paraxial region, wherein the second lens element is made of plastic material and the surfaces thereof are aspheric. The third lens element with negative refractive power has an object-side surface being concave at a paraxial region, and an image-side surface being concave at a paraxial region and being convex at a peripheral region, wherein the third lens element is made of plastic material, and the surfaces thereof are aspheric.

22 Claims, 19 Drawing Sheets

PHOTOGRAPHING LENS ASSEMBLY

RELATED APPLICATIONS

The application claims priority to Taiwan Application Serial Number 101114199, filed Apr. 20, 2012, which is herein incorporated by reference.

BACKGROUND

1. Technical Field

The present disclosure relates to a photographing lens assembly. More to particularly, the present disclosure relates to a compact photographing lens assembly applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system adopts a three-element lens structure such as U.S. Pat. No. 8,094,231 B2 which provides a good image quality and a compact size. The said optical lens system provides a first lens element and a second lens element both with positive refractive power, and a third lens element with negative refractive power. However, only one lens element with negative refractive power cannot reduce the back focal length of the optical lens system, so that the requirement of the compact size for the optical lens system is hard to obtain. Moreover, the refraction angle from the optical lens system cannot be minimized by the curvature of the surfaces of the second lens element and the third lens element, so that the aberration and the loss of the peripheral brightness thereof cannot be controlled.

SUMMARY

According to one aspect of the present disclosure, a photographing lens assembly includes, in order from an object side to an image side, a first lens element, a second lens element and a third lens element. The first lens element with positive refractive power has an object-side surface being convex at a paraxial region. The second lens element with negative refractive power has an object-side surface being concave at a paraxial region and an image-side surface being concave or planar at a paraxial region, wherein the second lens element is made of plastic material and the object-side surface and the image-side surface of the second lens element are aspheric. The third lens element with negative refractive power has an object-side surface being concave at a paraxial region, and an image-side surface being concave at a paraxial region and being convex at a peripheral region, wherein the third lens element is made of plastic material, and the object-side surface and the image-side surface of the third lens element are aspheric.

According to another aspect of the present disclosure, a photographing lens assembly includes, in order from an object side to an image side, a first lens element, a second lens element and a third lens element. The first lens element with positive refractive power has an object-side surface being convex at a paraxial region. The second lens element with negative refractive power has an object-side surface being concave at a paraxial region and an image-side surface being concave or planar at a paraxial region, wherein the second lens element is made of plastic material, and the object-side surface and the image-side surface of the second lens element are aspheric. The third lens element with negative refractive power has an object-side surface being concave at a paraxial region, and an image-side surface being concave at a paraxial region and being convex at a peripheral region, wherein the third lens element is made of plastic material, and the object-side surface and the image-side surface of the third lens element are aspheric. When a curvature radius of the object-side surface of the second lens element is R3, a curvature radius of the image-side surface of the second lens element is R4, a curvature radius of the object-side surface of the third lens element is R5, and a curvature radius of the image-side surface of the third lens element is R6, the following relationships are satisfied:

$-1.5 < R3/R4 \leq 0$; and $-0.5 < R6/R5 < 0$.

DETAILED DESCRIPTION

Figure 1:
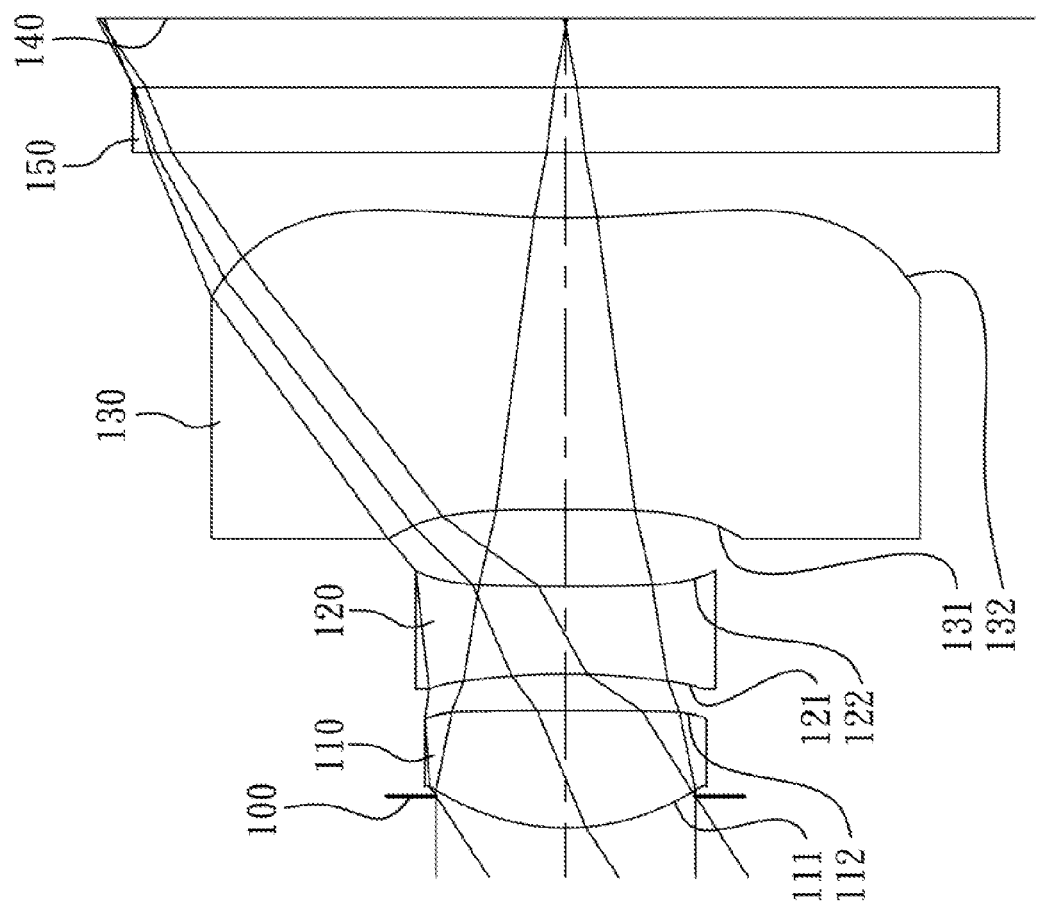
FIG. 1 is a schematic view of a photographing lens assembly according to the 1st embodiment of the present disclosure.

A photographing lens assembly includes, in order from an object side to an image side, a first lens element, a second lens element and a third lens element.

The first lens element with positive refractive power provides proper positive refractive power for the photographing lens assembly. The first lens element has an object-side surface being convex at a paraxial region, so that the total track length of the photographing lens assembly can be reduced by adjusting the positive refractive power of the first lens element.

The second lens element with negative refractive power corrects the aberration generated from the first lens element with positive refractive power. The second lens element has an object-side surface being concave at a paraxial region and an image-side surface being concave or planar at a paraxial region, and thereby it is favorable for correcting the aberration of the photographing lens assembly by changing the refractive power of the second lens element through adjusting the curvature of the second lens element.

The third lens element with negative refractive power has an object-side surface being concave at a paraxial region, and an image-side surface being concave at a paraxial region and being convex at a peripheral region. Therefore, the principal point of the photographing lens assembly can be positioned away from the image plane, and the total track length of the photographing lens assembly can be reduced so as to keep the photographing lens assembly compact. Furthermore, the aberration of the off-axis field can be corrected through reducing the angle of incidence onto the image sensor from the off-axis field.

When an Abbe number of the first lens element is V1, and an Abbe number of the second lens element is V2, the following relationship is satisfied:

$1.5 < V1/V2 < 3.5$.

Therefore, the chromatic aberration of the photographing lens assembly can be corrected.

When a focal length of the second lens element is f2, and a focal length of the third lens element is f3, the following relationship is satisfied:

$0 < f2/f3 < 1.20$.

By the proper distribution of the negative refractive power of the second lens element and the third lens element, the location of the exit pupil of the photographing lens assembly would be closer to an image plane, so that the back focal length thereof can be effectively reduced. Therefore, the total track length and sensitivity of the photographing lens assembly can be further reduced.

When a curvature radius of the object-side surface of the second lens element is R3, and a curvature radius of the image-side surface of the second lens element is R4, the following relationship is satisfied:

$-1.5 < R3/R4 \leq 0$.

Therefore, it is favorable for better correcting the aberration of the second lens element by adjusting the curvature of the second lens element in order to control the negative refractive power thereof.

R3 and R4 can further satisfy the following relationship:

$-0.35 < R3/R4 \leq 0$.

When a curvature radius of the object-side surface of the third lens element is R5, and a curvature radius of the image-side surface of the third lens element is R6, the following relationship is satisfied:

$-0.5 < R6/R5 < 0$.

Therefore, the sensitivity of the photographing lens assembly can be effectively reduced by adjusting the surface curvature of the third lens element, and the principal point of the photographing lens assembly can be further positioned away from the image plane, and the total track length of the photographing lens assembly can be reduced so as to keep the photographing lens assembly compact.

R6 and R5 can further satisfy the following relationship:

$-0.35 < R6/R5 < 0$.

Moreover, by such arrangement of the curvature of the second lens element and the third lens element, the refraction angle from the photographing lens assembly would be minimized for reducing the aberration and the loss of the peripheral brightness.

When a focal length of the photographing lens assembly is f, a curvature radius of the image-side surface of the second lens element is R4, and a curvature radius of the object-side surface of the third lens element is R5, the following relationship is satisfied:

$0 < f/|R4| + f/|R5| < 0.80$.

Therefore, the distribution of the negative refractive power of the photographing lens assembly is proper for reducing the sensitivity of the photographing lens assembly.

f, R4 and R5 can further satisfy the following relationship:

$0 < f/|R4| + f/|R5| < 0.50$.

When the focal length of the photographing lens assembly is f, and a focal length of the first lens element is f1 the following relationship is satisfied:

$1.20 < f/f1 < 2.00$.

Therefore, the total track length of the photographing lens assembly can be reduced by adjusting the positive refractive power of the first lens element.

f and f1 can further satisfy the following relationship:

$1.40 < f/f1 < 1.80$.

When the focal length of the photographing lens assembly is f, the focal length of the first lens element is f1, and a focal length of the second lens element is f2, a focal length of the third lens element is f3, the following relationship is satisfied:

$1.85 < (f/f1) - (f/f2) - (f/f3) < 3.50$.

Therefore, it is favorable for reducing the total track length of the photographing lens assembly, minimizing the refraction angle for the photographing lens assembly, effectively reducing the aberration, reducing the loss of the peripheral brightness and also reducing the sensitivity of the photographing lens assembly by proper distributing the refractive power of each lens element.

When a central thickness of the second lens element is CT2, and a central thickness of the third lens element is CT3, the following relationship is satisfied:

0.10<CT2/CT3<0.60.

By such arrangement, it is favorable for manufacturing and yield rate of the lens elements.

When an axial distance between the first lens element and the second lens element is T12, and an axial distance between the second lens element and the third lens element is T23, the following relationship is satisfied:

0.05<T12/T21<0.70.

Therefore, it is favorable for assembling the photographing lens assembly and keeping the lens assembly compact through adjusting the distances between lens elements.

When a distance in parallel with an optical axis from a maximum effective diameter position on the image-side surface of the second lens element to an axial vertex on the image-side surface of the second lens element is SAG22, and a central thickness of the second lens element is CT2, the following relationship is satisfied:

0<SAG22/CT2<0.40.

Therefore, it is favorable for manufacturing and assembling the photographing lens assembly through arranging proper surface curvature and thickness of the second lens element in order to raise the yield rate.

According to the photographing lens assembly of the present disclosure, the lens elements thereof can be made of glass or plastic material. When the lens elements are made of glass material, the distribution of the refractive power of the photographing lens assembly may be more flexible to design. When the lens elements are made of plastic material, the production cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. The total track length of the photographing lens assembly can thereby be reduced.

According to the photographing lens assembly of the present disclosure, when a lens element has a convex surface, it indicates that the surface is convex at a paraxial region; and when the lens element has a concave surface, it indicates that the surface is concave at the paraxial region.

According to the photographing lens assembly of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop can provide a longer distance from an exit pupil of the system to an image plane and thereby the generated telecentric effect improves the image-sensing efficiency of an image sensor. A middle stop is favorable for enlarging the field of view of the system and thereby provides a wider field of view for the same.

According to the above description of the present disclosure, the following 1st-9th specific embodiments are provided for further explanation.

1st Embodiment

FIG. 1 is a schematic view of a photographing lens assembly according to the 1st embodiment of the present disclosure.

Figure 2:
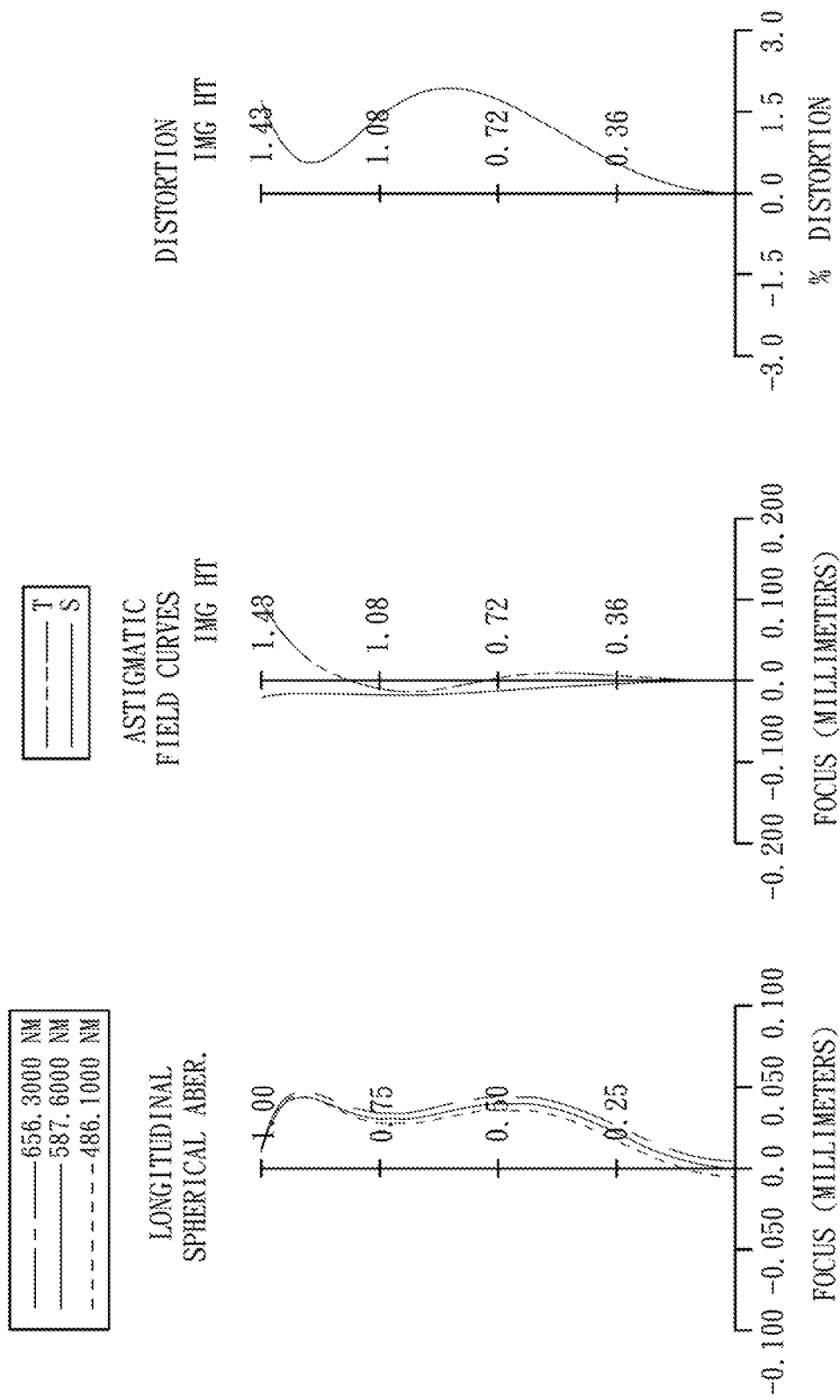
FIG. 2 shows spherical aberration curves, astigmatic field curves and a distortion curve of the photographing lens assembly according to the 1st embodiment.

FIG. 2 shows spherical aberration curves, astigmatic field curves and a distortion curve of the photographing lens assembly according to the 1st embodiment. In FIG. 1, the photographing lens assembly includes, in order from an object side to an image side, an aperture stop 100, a first lens element 110, a second lens element 120, a third lens element 130, an IR-cut filter 150 and an image plane 140.

The first lens element 110 with positive refractive power has an object-side surface 111 being convex at a paraxial region and an image-side surface 112 being convex at a paraxial region. The first lens element 110 is made of plastic material, and has the object-side surface 11 and the image-side surface 112 being aspheric.

The second lens element 120 with negative refractive power has an object-side surface 121 being concave at a paraxial region and an image-side surface 122 being concave at a paraxial region. The second lens element 120 is made of plastic material, and has the object-side surface 121 and the image-side surface 122 being aspheric.

The third lens element 130 with negative refractive power has an object-side surface 131 being concave at a paraxial region, and an image-side surface 132 being concave at a paraxial region and being convex at a peripheral region, wherein the third lens element 130 is made of plastic material, and has the object-side surface 231 and the image-side surface 232 being aspheric.

The IR-cut filter 150 is made of glass, and located between the third lens element 130 and the image plane 140, and will not affect the focal length of the photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the photographing lens assembly according to the 1st embodiment, when a focal length of the photographing lens assembly is f, an f-number of the photographing lens assembly is Fno, and half of the maximal field of view of the photographing lens assembly is HFOV these parameters have the following in values:

f=2.14 mm;

Fno=2.70; and

HFOV=33.0 degrees.

In the photographing lens assembly according to the 1st embodiment, when an Abbe number of the first lens element 110 is V1, and an Abbe number of the second lens element 120 is V2, the following relationship is satisfied:

V1/V2=2.61.

In the photographing lens assembly according to the 1st embodiment, when a central thickness of the second lens element 120 is CT2, and a central thickness of the third lens element 130 is CT3, the following relationship is satisfied:

$$CT2/CT3=0.30.$$

In the photographing lens assembly according to the 1st embodiment, when an axial distance between the first lens element 110 and the second lens element 120 is T12, and an axial distance between the second lens element 120 and the third lens element 130 is T23, the following relationship is satisfied:

$$T12/T23=0.47$$

Figure 19:
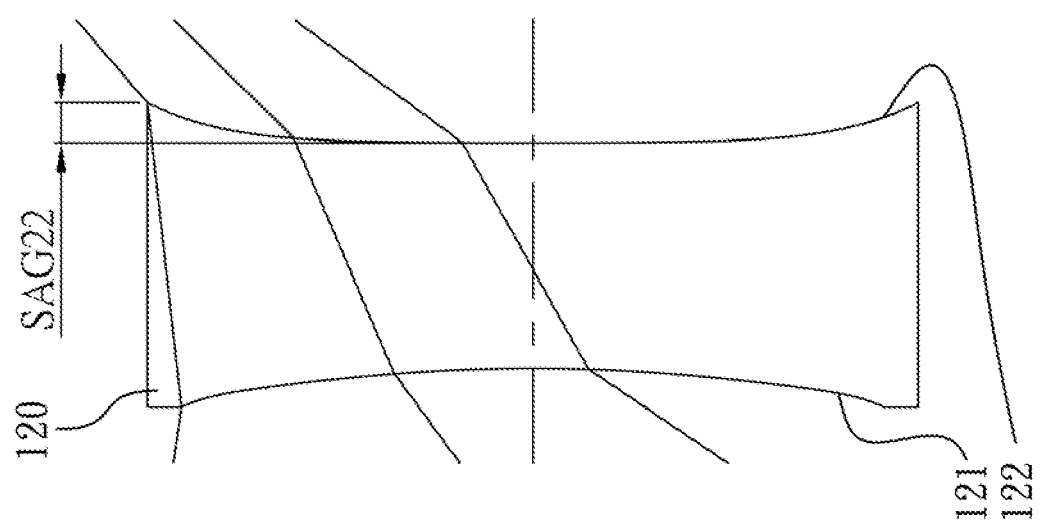
FIG. 19 shows SAG22 of the second lens element of the photographing lens assembly as depicted in FIG. 1.

FIG. 19 shows SAG22 of the second lens element 120 of the photographing lens assembly as depicted in FIG. 1. In FIG. 19, when a distance in parallel with an optical axis from a maximum effective diameter position on the image-side surface 122 of the second lens element 120 to an axial vertex on the image-side surface 122 of the second lens element 120 is SAG22, and a central thickness of the second lens element 120 is CT2, the following relationship is satisfied:

$$SAG22/CT2=0.18.$$

In the photographing lens assembly according to the 1st embodiment, when the focal length of the photographing lens assembly is f, a curvature radius of the object-side surface 121 of the second lens element 120 is R3, a curvature radius of the image-side surface 122 of the second lens element 120 is R4, a curvature radius of the object-side surface 131 of the third lens element 130 is R5, and a curvature radius of the image-side surface 132 of the third lens element 130 is R6, the following relationships are satisfied:

$$R3/R4=-0.08;$$

$$R6/R5=-0.11; \text{ and}$$

$$|f/R4|+|f/R5|=0.16.$$

In the photographing lens assembly according to the 1st embodiment, when the focal length of the photographing lens assembly is f, a focal length of the first lens element 110 is f1, a focal length of the second lens element 120 is f2, and a focal length of the third lens element 130 is f3, the following relationships are satisfied:

$$f/f1=1.65;$$

$$f2/f3=0.54; \text{ and}$$

$$(f/f1)-(f/f2)-(f/f3)=2.79.$$

The detailed optical data of the 1st embodiment are shown in Table 1 and the aspheric surface data are shown in Table 2 below

TABLE 1

1st Embodiment
f = 2.14 mm, Fno = 2.70, HFOV = 33.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.097 | | | | |
| 2 | Lens 1 | 0.717 | (ASP) | 0.357 | Plastic | 1.544 | 55.9 | 1.30 |
| 3 | | −47.081 | (ASP) | 0.112 | | | | |
| 4 | Lens 2 | −2.040 | (ASP) | 0.269 | Plastic | 1.650 | 21.4 | −2.88 |
| 5 | | 24.027 | (ASP) | 0.236 | | | | |
| 6 | Lens 3 | −28.927 | (ASP) | 0.893 | Plastic | 1.544 | 55.9 | −5.36 |
| 7 | | 3.281 | (ASP) | 0.200 | | | | |
| 8 | IR-cut filter | Plano | | 0.200 | Glass | 1.517 | 64.2 | — |
| 9 | | Plano | | 0.210 | | | | |
| 10 | Image | Plano | | — | | | | |

Note:
Reference wavelength (d-line) is 587.6 nm.

TABLE 2

Aspheric Coefficients

| | Surface # | | | | | |
|---|---|---|---|---|---|---|
| | 2 | 3 | 4 | 5 | 6 | 7 |
| k = | −2.7501E−01 | 3.0000E+00 | −1.9468E+01 | −1.0000E+00 | −1.0000E+00 | −6.4419E+00 |
| A4 = | −2.6574E−01 | −1.3898E−01 | −1.8865E−03 | 3.6947E−01 | −9.9412E−01 | −2.5102E−01 |
| A6 = | 3.8086E+00 | −1.3642E+00 | 1.0293E+00 | 2.3228E+00 | 2.3263E−01 | 7.1398E−02 |
| A8 = | −1.8294E+01 | 2.0832E+01 | −2.8485E+01 | 4.6371E+00 | 2.5712E+00 | −1.3453E−01 |
| A10 = | 1.5695E+01 | −1.4617E+02 | 3.4103E+02 | −1.1036E+01 | −8.0468E+00 | 8.9886E−02 |
| A12 = | −3.1250E−02 | 6.4544E−07 | −1.5344E+03 | 1.2727E+01 | −6.4098E+01 | −3.4187E−02 |
| A14 = | — | — | — | — | 6.1239E+01 | −3.0221E−02 |
| A16 = | — | — | — | — | 4.3197E+02 | 1.9014E−02 |

In Table 1, the curvature radius, the thickness and the focal length are shown in millimeters (mm). Surface numbers 0-10 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
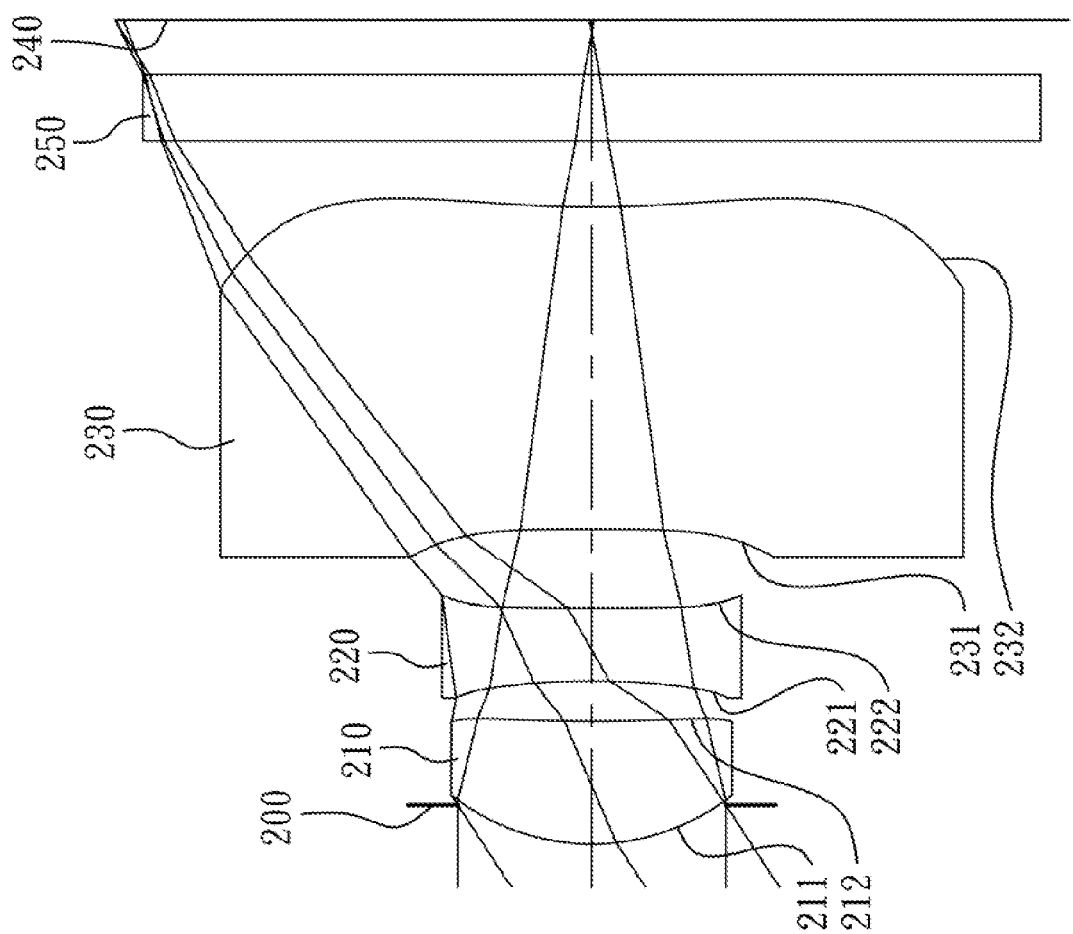
FIG. 3 is a schematic view of a photographing lens assembly according to the 2nd embodiment of the present disclosure.
Figure 4:
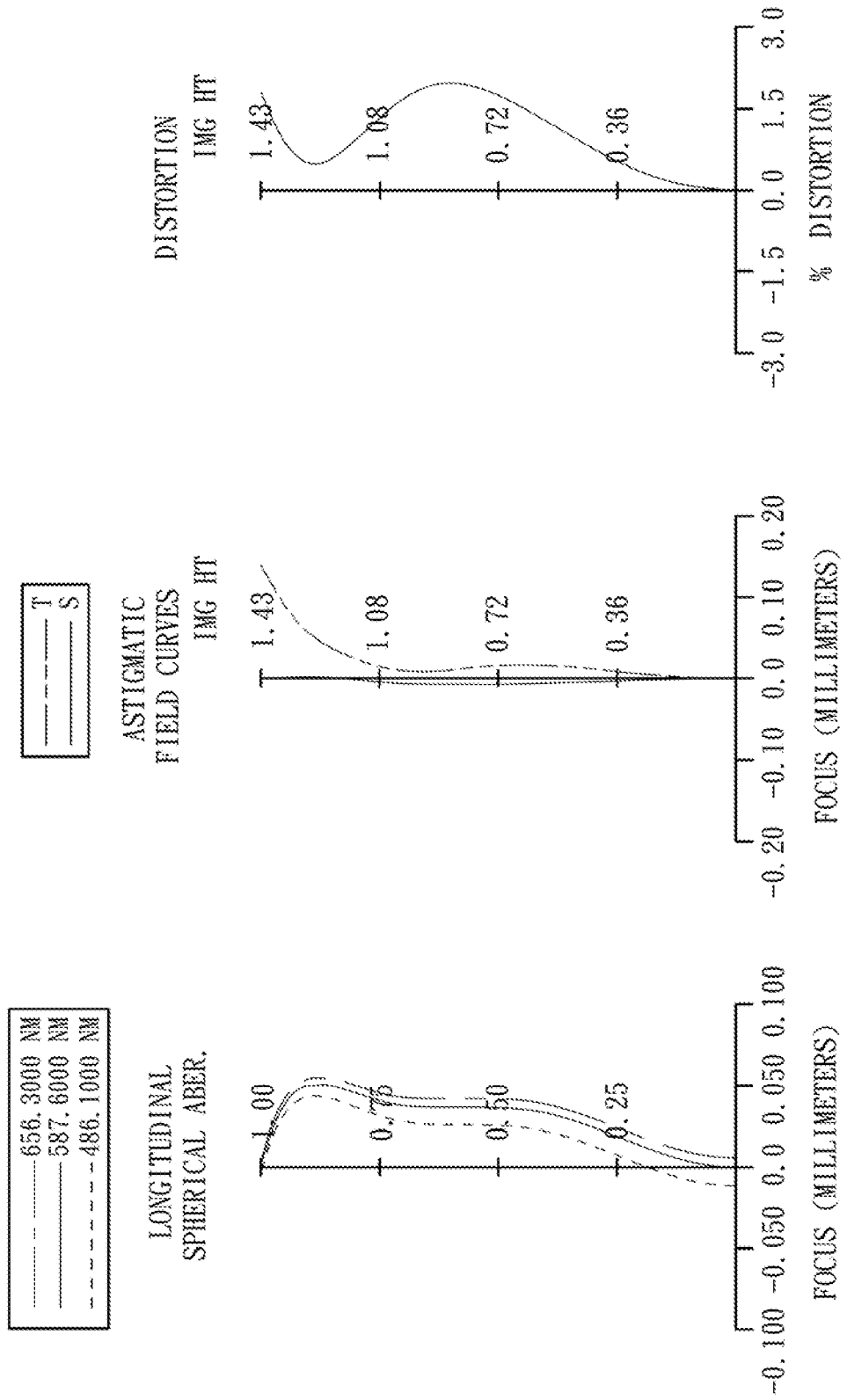
FIG. 4 shows spherical aberration curves, astigmatic field curves and a distortion curve of the photographing lens assembly according to the 2nd embodiment.

FIG. 3 is a schematic view of a photographing lens assembly according to the 2nd embodiment of the present disclosure. FIG. 4 shows spherical aberration curves, astigmatic field curves and a distortion curve of the photographing lens assembly according to the 2nd embodiment. In FIG. 3, the photographing lens assembly includes, in order from an object side to an image side, an aperture stop 200, a first lens element 210, a second lens element 220, a third lens element 230, an IR-cut filter 250 and an image plane 240.

The first lens element 210 with positive refractive power has an object-side surface 211 being convex at a paraxial region and an image-side surface 212 being concave at a paraxial region. The first lens element 210 is made of plastic material, and has the object-side surface 211 and the image-side surface 212 being aspheric.

The second lens element 220 with negative refractive power has an object-side surface 221 being concave at a paraxial region and an image-side surface 222 being concave at a paraxial region. The second lens element 220 is made of plastic material, and has the object-side surface 221 and the image-side surface 222 being aspheric.

The third lens element 230 with negative refractive power has an object-side surface 231 being concave at a paraxial region, and an image-side surface 232 being concave at a paraxial region and being convex at a peripheral region, wherein the third lens element 230 is made of plastic material, and has the object-side surface 231 and the image-side surface 232 being aspheric.

The IR-cut filter 250 is made of glass, and located between the third lens element 230 and the image plane 240, and will not affect the focal length of the photographing lens assembly.

The detailed optical data of the 2nd embodiment are shown in Table 3 and the aspheric surface data are shown in Table 4 below.

TABLE 3

2nd Embodiment
f = 2.14 mm, Fno = 2.65, HFOV = 33.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.117 | | | | |
| 2 | Lens 1 | 0.676 | (ASP) | 0.368 | Plastic | 1.544 | 55.9 | 1.38 |
| 3 | | 5.411 | (ASP) | 0.122 | | | | |
| 4 | Lens 2 | −2.217 | (ASP) | 0.220 | Plastic | 1.640 | 23.3 | −3.38 |
| 5 | | 96.805 | (ASP) | 0.238 | | | | |
| 6 | Lens 3 | −30.371 | (ASP) | 0.969 | Plastic | 1.544 | 55.9 | −5.50 |
| 7 | | 3.357 | (ASP) | 0.200 | | | | |
| 8 | IR-cut filter | Plano | | 0.200 | Glass | 1.517 | 64.2 | |
| 9 | | Plano | | 0.162 | | | | |
| 10 | Image | Plano | | — | | | | |

Note:
Reference wavelength (d-line) is 587.6 nm.

TABLE 4

Aspheric Coefficients

| | Surface # | | | | |
|---|---|---|---|---|---|
| 2 | 3 | 4 | 5 | 6 | 7 |
| k = −1.5615E−01 | −1.8101E+01 | −2.2140E+01 | −1.0000E+00 | −1.0000E+00 | −3.0247E+00 |
| A4 = −2.0028E−01 | −1.6072E−01 | −3.4201E−01 | 2.0123E−01 | −9.4437E−01 | −2.2536E−01 |
| A6 = 3.8179E+00 | −3.0701E−01 | −2.8057E−01 | 2.7838E+00 | 4.6796E−01 | 8.1289E−02 |
| A8 = −1.9847E+01 | 1.3662E+01 | −5.4900E+00 | 2.1356E+00 | 1.1922E+00 | −1.7465E−01 |
| A10 = 3.5493E+01 | −1.3531E+02 | 2.1760E+02 | 2.3746E+00 | −6.0782E+00 | 1.0234E−01 |
| A12 = −3.1247E−02 | 7.7430E−07 | −1.5344E+03 | 1.2727E+01 | −5.2099E+01 | −5.3963E−03 |
| A14 = — | — | — | — | 1.0857E+02 | −4.3192E−02 |
| A16 = — | — | — | — | 1.8359E+02 | 1.8571E−02 |

In the photographing lens assembly according to the 2nd embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 2nd embodiment. Moreover, these parameters can be calculated from Table 3 and Table 4 as the following values and satisfy the following relationships:

| f (mm) | 2.14 | R3/R4 | −0.02 |
|---|---|---|---|
| Fno | 2.65 | R6/R5 | −0.11 |
| HFOV (deg.) | 33.0 | f/|R4| + f/|R5| | 0.09 |
| V1/V2 | 2.40 | f/f1 | 1.55 |
| CT2/CT3 | 0.23 | f2/f3 | 0.62 |
| T12/T23 | 0.51 | (f/f1) − (f/f2) − (f/f3) | 2.57 |
| SAG22/CT2 | 0.17 | | |

3rd Embodiment

Figure 5:
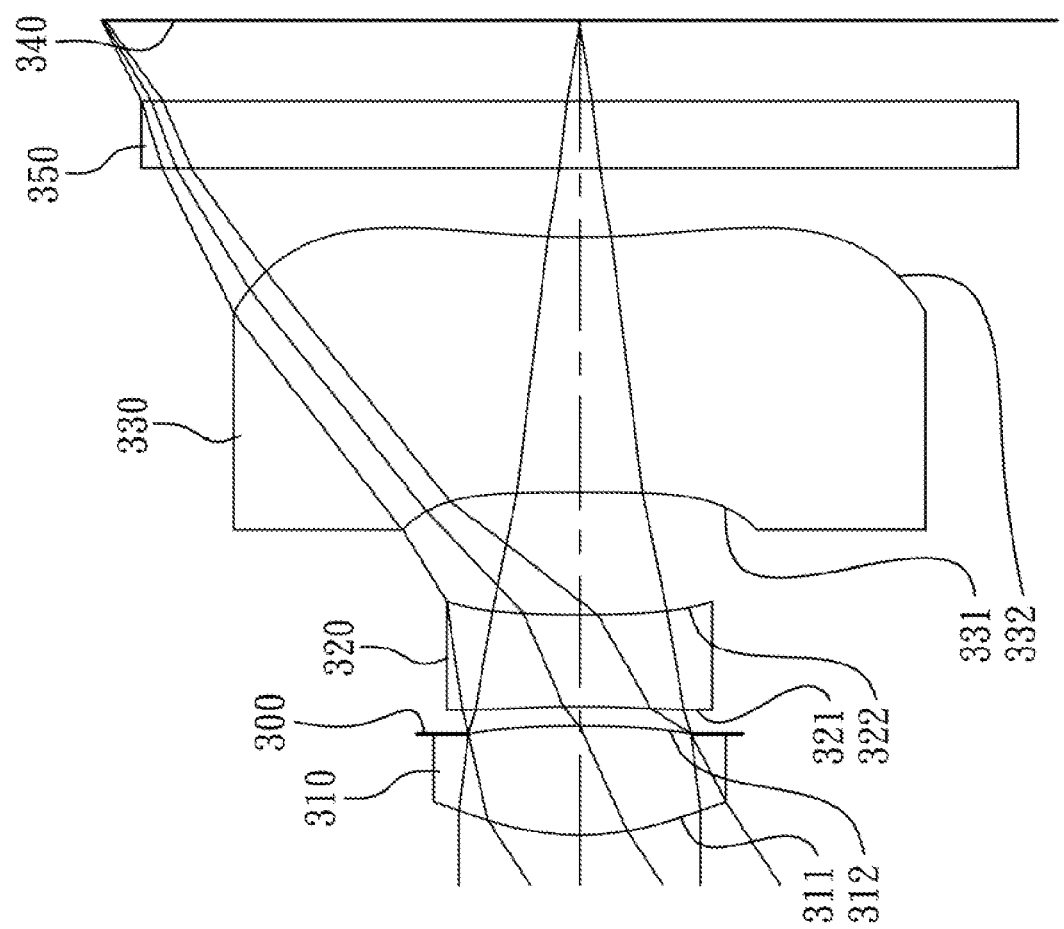
FIG. 5 is a schematic view of a photographing lens assembly according to the 3rd embodiment of the present disclosure.
Figure 6:
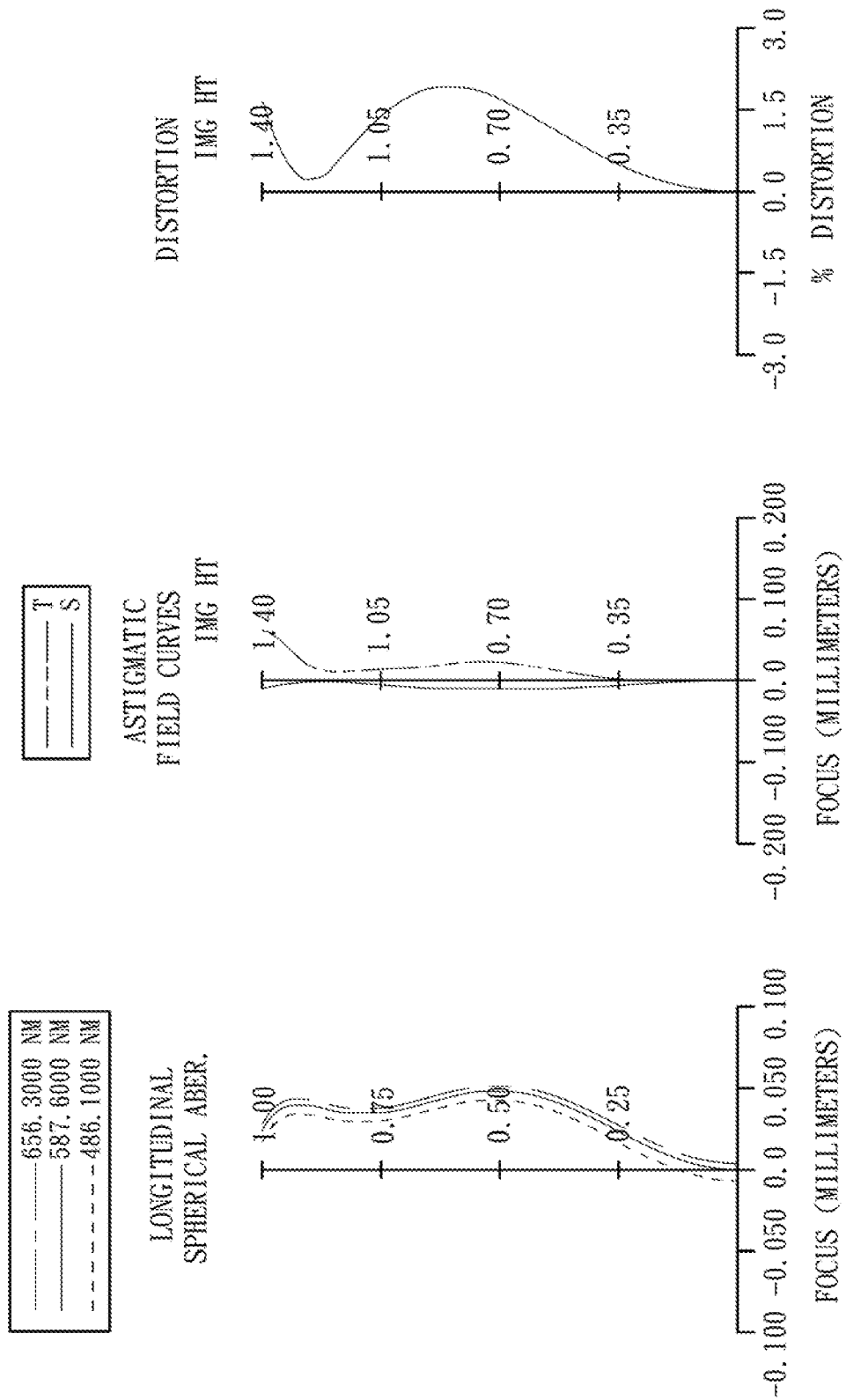
FIG. 6 shows spherical aberration curves, astigmatic field curves and a distortion curve of the photographing lens assembly according to the 3rd embodiment.

FIG. 5 is a schematic view of a photographing lens assembly according to the 3rd embodiment of the present disclosure. FIG. 6 shows spherical aberration curves, astigmatic field curves and a distortion curve of the photographing lens assembly according to the 3rd embodiment. In FIG. 5, the photographing lens assembly includes, in order from an object side to an image side, a first lens element 310 an aperture stop 300, a second lens element 320, a third lens element 330, an IR-cut filter 350 and an image plane 340.

The first lens element 310 with positive refractive power has an object-side surface 311 being convex at a paraxial region and an image-side surface 312 being convex at a paraxial region. The first lens element 310 is made of plastic material, and has the object-side surface 311 and the image-side surface 312 being aspheric.

The second lens element 320 with negative refractive power has an object-side surface 321 being concave at a paraxial region and an image-side surface 322 being concave at a paraxial region. The second lens element 320 is made of plastic material, and has the object-side surface 321 and the image-side surface 322 being aspheric.

The third lens element 330 with negative refractive power has an object-side surface 331 being concave at a paraxial region, and an image-side surface 332 being concave at a paraxial region and being convex at a peripheral region, wherein the third lens element 330 is made of plastic material, and has the object-side surface 331 and the image-side surface 332 being aspheric.

The IR-cut filter 350 is made of glass, and located between the third lens element 330 and the image plane 340, and will not affect the focal length of the photographing lens assembly.

The detailed optical data of the 3rd embodiment are shown in Table 5 and the aspheric surface data are shown in Table 6 below.

TABLE 5

3rd Embodiment
f = 2.09 mm, Fno = 2.95, HFOV = 32.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 0.823 | (ASP) | 0.320 | Plastic | 1.544 | 55.9 | 1.26 |
| 2 | Ape. Stop | −3.466 | (ASP) | 0.057 | | | | |
| 3 | Lens 2 | −4.099 | (ASP) | 0.270 | Plastic | 1.640 | 23.3 | −2.95 |
| 4 | | 3.578 | (ASP) | 0.360 | | | | |
| 5 | Lens 3 | −27.712 | (ASP) | 0.750 | Plastic | 1.544 | 55.9 | −4.22 |
| 6 | | 2.530 | (ASP) | 0.200 | | | | |
| 7 | IR-cut filter | Plano | | 0.200 | Glass | 1.517 | 64.2 | — |
| 8 | | Plano | | 0.236 | | | | |
| 9 | Image | Plano | | — | | | | |

Note:
Reference wavelength (d-line) is 587.6 nm.
The aperture stop is located on the surface 2.

TABLE 6

Aspheric Coefficients

| | Surface # | | | | |
|---|---|---|---|---|---|
| 1 | 2 | 3 | 4 | 5 | 6 |
| k = −6.2938E−01 | −2.9050E+01 | −2.9826E+01 | −1.0000E+00 | −1.0000E+00 | 2.4004E+00 |
| A4 = −2.6995E−01 | −5.5626E−01 | −3.9023E−01 | 2.6801E−01 | −1.0073E+00 | −4.1539E−01 |
| A6 = 7.7484E−01 | −6.4299E+00 | 8.8638E+00 | 3.0255E+00 | −2.2003E+00 | 1.6023E−01 |
| A8 = −1.6234E+01 | 7.8363E+01 | −6.0647E+01 | −2.9066E+00 | 1.2438E+01 | −2.9410E−01 |
| A10 = 2.7383E+01 | −2.3763E+02 | 4.8468E+02 | 6.0230E+01 | −1.8569E+01 | 2.1564E−01 |
| A12 = −1.9257E+01 | −2.7066E+02 | −1.5206E+03 | −1.1475E+02 | −1.3910E+02 | 1.0400E−01 |
| A14 = −3.9326E−04 | −3.8380E−04 | −3.9010E−04 | −3.8731E−04 | 1.5759E+01 | −4.2798E−01 |
| A16 = — | — | — | — | 7.6418E+02 | 2.2504E−01 |

In the photographing lens assembly according to the 3rd embodiment, the definitions of f, Fno, HFOV, V1, V2, CT2, CT3, T12, T23, SAG22, R3, R4, R5 R6, f1, f2 and f3 are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 2.09 | R3/R4 | −1.15 |
| Fno | 2.95 | R6/R5 | −0.09 |
| HFOV (deg.) | 32.9 | f/\|R4\| + f/\|R5\| | 0.66 |
| V1/V2 | 2.40 | f/f1 | 1.67 |
| CT2/CT3 | 0.36 | f2/f3 | 0.70 |
| T12/T23 | 0.16 | (f/f1) − (f/f2) − (f/f3) | 2.86 |
| SAG22/CT2 | 0.15 | | |

4th Embodiment

Figure 7:
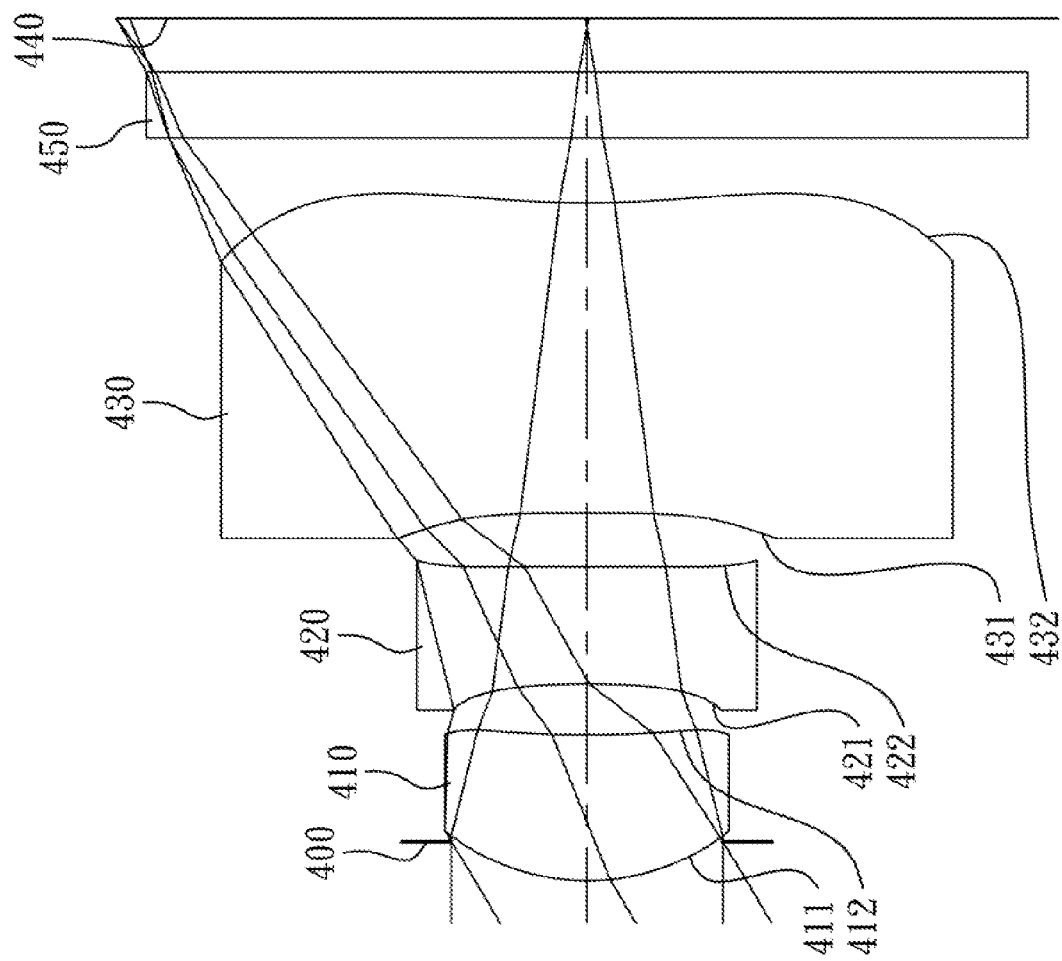
FIG. 7 is a schematic view of a photographing lens assembly according to the 4th embodiment of the present disclosure.
Figure 8:
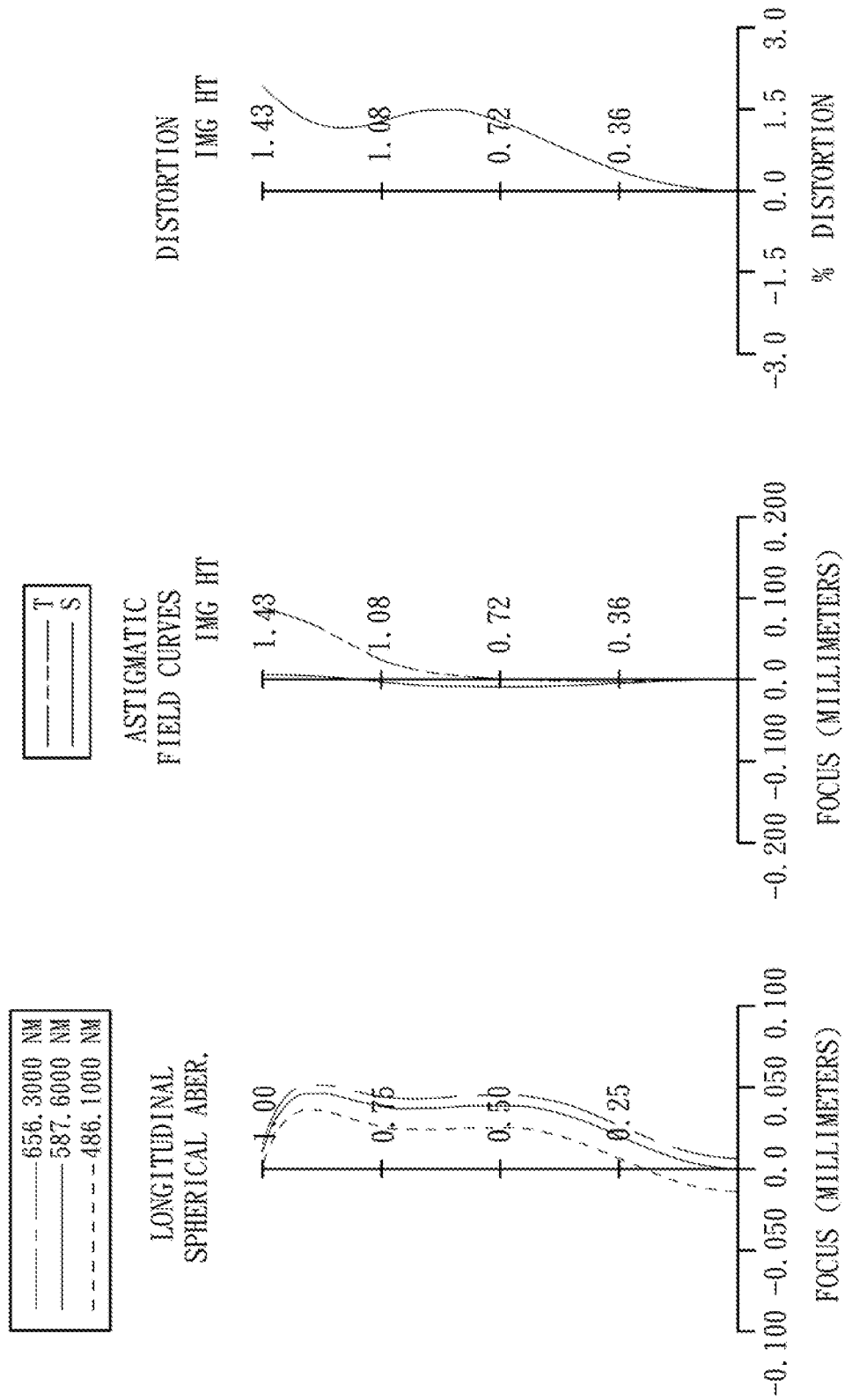
FIG. 8 shows spherical aberration curves, astigmatic field curves and a distortion curve of the photographing lens assembly according to the 4th embodiment.

FIG. 7 is a schematic view of a photographing lens assembly according to the 4th embodiment of the present disclosure. FIG. 8 shows spherical aberration curves, astigmatic field curves and a distortion curve of the photographing lens assembly according to the 4th embodiment. In FIG. 7, the photographing lens assembly includes, in order from an object side to an image side, an aperture stop 400, a first lens element 410, a second lens element 420, a third lens element 430, an IR-cut filter 450 and an image plane 440.

The first lens element 410 with positive refractive power has an object-side surface 411 being convex at a paraxial region and an image-side surface 412 being concave at a paraxial region. The first lens element 410 is made of plastic material, and has the object-side surface 411 and the image-side surface 412 being aspheric.

The second lens element 420 with negative refractive power has an object-side surface 421 being concave at a paraxial region and an image-side surface 422 being concave at a paraxial region. The second lens element 420 is made of plastic material, and has the object-side surface 421 and the image-side surface 422 being aspheric.

The third lens element 430 with negative refractive power has an object-side surface 431 being concave at a paraxial region, and an image-side surface 432 being concave at a paraxial region and being convex at a peripheral region, wherein the third lens element 430 is made of plastic material, and has the object-side surface 431 and the image-side surface 432 being aspheric.

The IR-cut filter 450 is made of glass, and located between the third lens element 430 and the image plane 440, and will not affect the focal length of the photographing lens assembly.

The detailed optical data of the 4th embodiment are shown in Table 7 and the aspheric surface data are shown in Table 8 below.

TABLE 7

4th Embodiment
f = 2.32 mm, Fno = 2.80, HFOV = 30.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.121 | | | | |
| 2 | Lens 1 | 0.686 | (ASP) | 0.447 | Plastic | 1.544 | 55.9 | 1.50 |
| 3 | | 3.288 | (ASP) | 0.153 | | | | |
| 4 | Lens 2 | −2.324 | (ASP) | 0.357 | Plastic | 1.640 | 23.3 | −3.42 |
| 5 | | 38.986 | (ASP) | 0.166 | | | | |
| 6 | Lens 3 | −81.037 | (ASP) | 0.944 | Plastic | 1.544 | 55.9 | −5.10 |
| 7 | | 2.887 | (ASP) | 0.200 | | | | |
| 8 | IR-cut filter | Plano | | 0.200 | Glass | 1.517 | 64.2 | — |
| 9 | | Plano | | 0.164 | | | | |
| 10 | Image | Plano | | — | | | | |

Note:
Reference wavelength (d-line) is 587.6 nm.

TABLE 8

Aspheric Coefficients

| Surface # | | | | | |
|---|---|---|---|---|---|
| 2 | 3 | 4 | 5 | 6 | 7 |
| k = −1.0746E−01 | 2.5295E−02 | −2.1909E+01 | −1.0000E+00 | −1.0000E+00 | −2.4052E+00 |
| A4 = −1.8523E−01 | −1.4478E−01 | −7.5315E−01 | −4.0844E−01 | −1.0472E+00 | −2.9807E−01 |
| A6 = 3.4838E+00 | 4.3885E−01 | −3.2259E+00 | 2.6321E+00 | 1.0981E+00 | 2.0817E−01 |
| A8 = −1.7857E+01 | −3.8654E+00 | 1.3873E+01 | −1.8610E−01 | −3.4583E−01 | −2.7093E−01 |
| A10 = 3.1795E+01 | −9.6032E+01 | 6.2910E+01 | −9.1230E+00 | −8.8034E−01 | 1.3623E−01 |
| A12 = −3.1247E−02 | 5.2353E−08 | −1.5344E+03 | 2.2304E+01 | −1.6604E−01 | 1.2179E−02 |
| A14 = — | — | — | — | 9.6387E+00 | −3.6405E−02 |
| A16 = — | — | — | — | 2.3339E+01 | 7.4516E−03 |

In the photographing lens assembly according to the 4th embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 4th embodiment. Moreover, these parameters can be calculated from Table 7 and Table 8 as the following values and satisfy the following relationships:

| f (mm) | 2.32 | R3/R4 | −0.06 |
|---|---|---|---|
| Fno | 2.80 | R6/R5 | −0.04 |
| HFOV (deg.) | 30.9 | f/|R4| + f/|R5| | 0.09 |
| V1/V2 | 2.40 | f/f1 | 1.54 |
| CT2/CT3 | 0.38 | f2/f3 | 0.67 |
| T12/T23 | 0.92 | (f/f1) − (f/f2) − (f/f3) | 2.68 |
| SAG22/CT2 | 0.06 | | |

5th Embodiment

Figure 9:
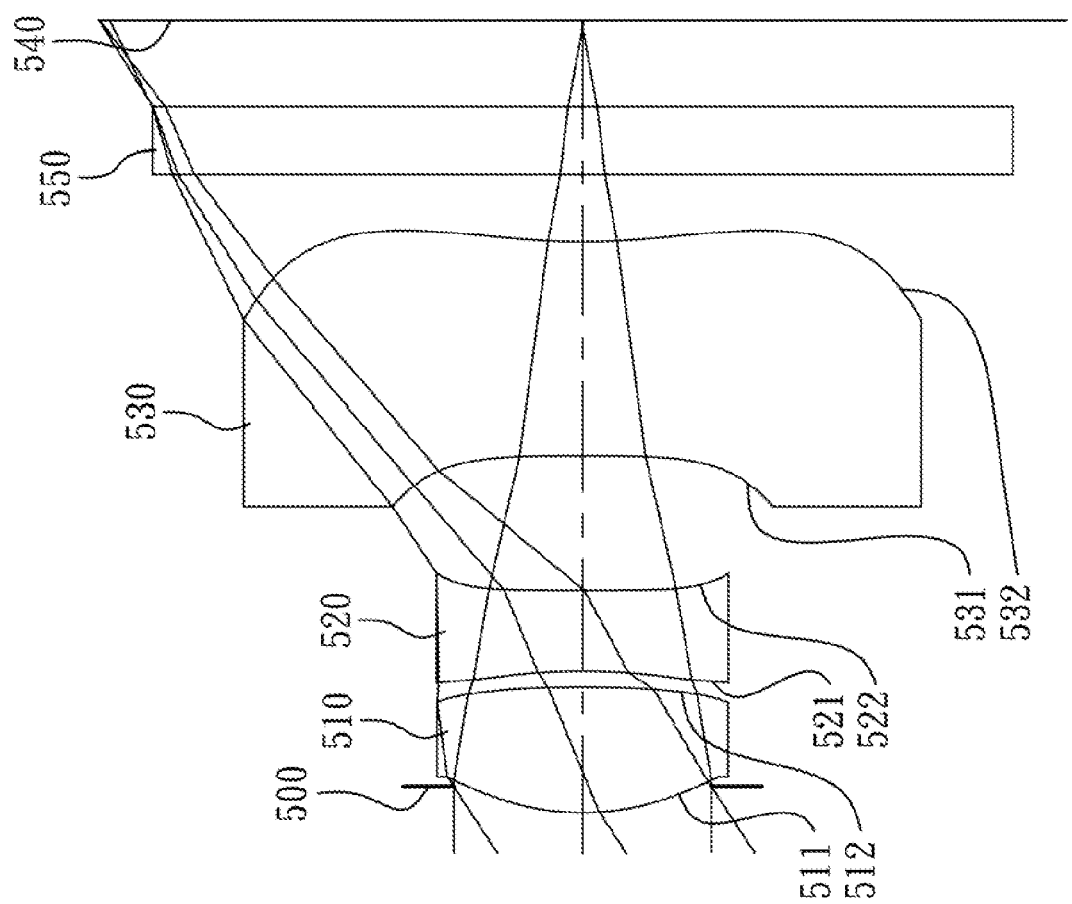
FIG. 9 is a schematic view of a photographing lens assembly according to the 5th embodiment of the present disclosure.
Figure 10:
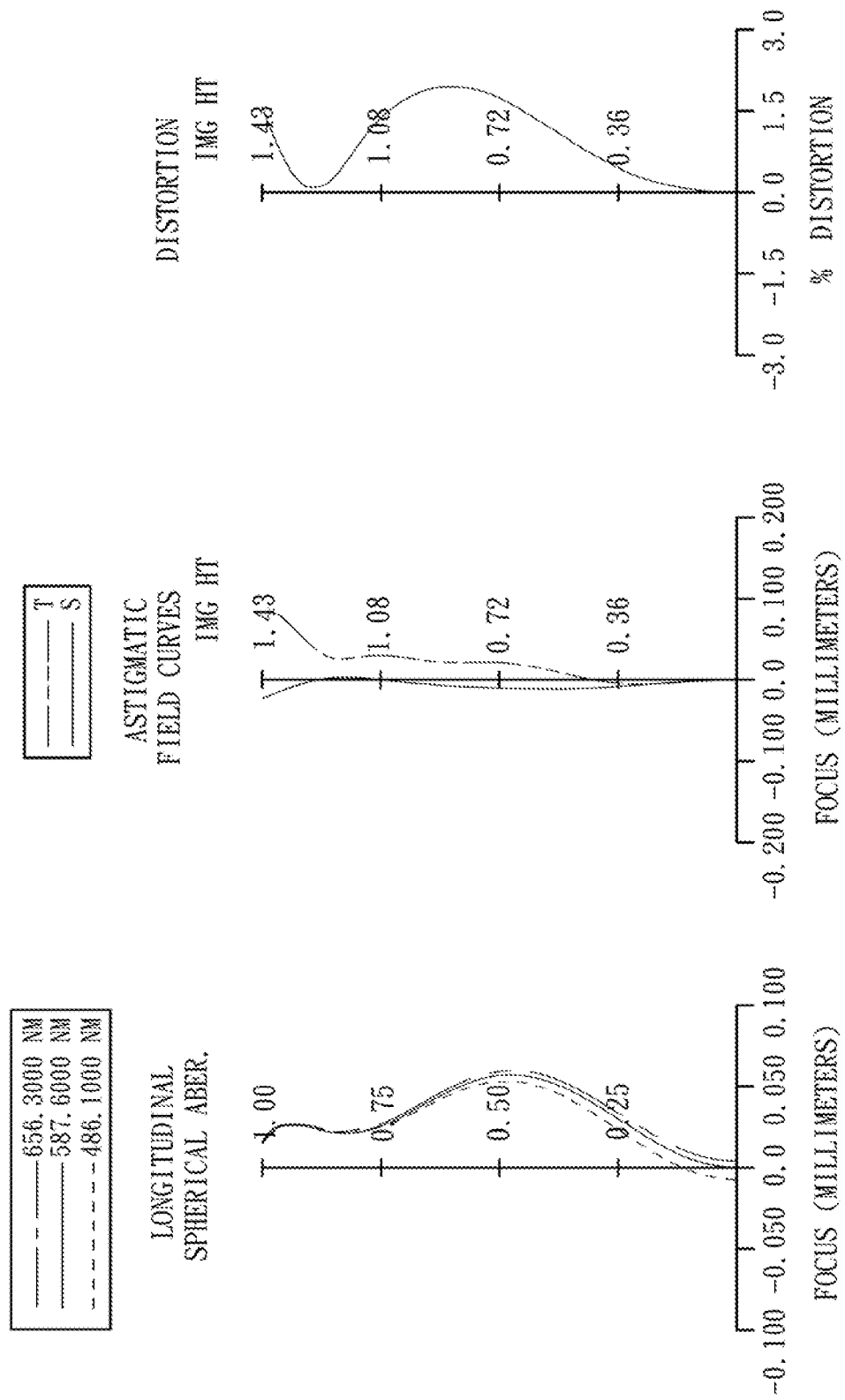
FIG. 10 shows spherical aberration curves, astigmatic field curves and a distortion curve of the photographing lens assembly according to the 5th embodiment.

FIG. 9 is a schematic view of a photographing lens assembly according to the 5th embodiment of the present disclosure. FIG. 10 shows spherical aberration curves, astigmatic field curves and a distortion curve of the photographing lens assembly according to the 5th embodiment. In FIG. 9, the photographing lens assembly includes, in order from an object side to an image side, an aperture stop 500, a first lens element 510, a second lens element 520, a third lens element 530, an IR-cut filter 550 and an image plane 540.

The first lens element 510 with positive refractive power has an object-side surface 511 being convex at a paraxial region and an image-side surface 512 being convex at a paraxial region. The first lens element 510 is made of plastic material, and has the object-side surface 511 and the image-side surface 512 being aspheric.

The second lens element 520 with negative refractive power has an object-side surface 521 being concave at a paraxial region and an image-side surface 522 being concave at a paraxial region. The second lens element 520 is made of plastic material, and has the object-side surface 521 and the image-side surface 522 being aspheric.

The third lens element 530 with negative refractive power has an object-side surface 531 being concave at a paraxial region, and an image-side surface 532 being concave at a paraxial region and being convex at a peripheral region, wherein the third lens element 530 is made of plastic material, and has the object-side surface 531 and the image-side surface 532 being aspheric.

The IR-cut filter 550 is made of glass, and located between the third lens element 530 and the image plane 540, and will not affect the focal length of the photographing lens assembly.

The detailed optical data of the 5th embodiment are shown in Table 9 and the aspheric surface data are shown in Table 10 below.

TABLE 9

5th Embodiment
f = 2.14 mm, Fno = 2.80, HFOV = 33.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.077 | | | | |
| 2 | Lens 1 | 0.744 | (ASP) | 0.373 | Plastic | 1.544 | 55.9 | 1.22 |
| 3 | | −5.064 | (ASP) | 0.047 | | | | |
| 4 | Lens 2 | −1.949 | (ASP) | 0.240 | Plastic | 1.640 | 23.3 | −2.91 |
| 5 | | 43.745 | (ASP) | 0.399 | | | | |
| 6 | Lens 3 | −18.070 | (ASP) | 0.635 | Plastic | 1.535 | 56.3 | −3.33 |
| 7 | | 1.998 | (ASP) | 0.200 | | | | |
| 8 | IR-cut filter | Plano | | 0.200 | Glass | 1.517 | 64.2 | |
| 9 | | Plano | | 0.257 | | | | |
| 10 | Image | Plano | | — | | | | |

Note:
Reference wavelength (d-line) is 587.6 nm.

TABLE 10

Aspheric Coefficients

| Surface # | | | | | |
|---|---|---|---|---|---|
| 2 | 3 | 4 | 5 | 6 | 7 |
| k = −4.2473E−01 | −3.0000E+01 | 1.1896E+00 | −1.0000E+00 | −1.0000E+00 | −1.7997E+00 |
| A4 = −2.0496E−01 | −7.9667E−01 | −6.6702E−01 | 4.3515E−01 | −9.1762E−01 | −5.1024E−01 |
| A6 = 2.1503E+00 | −6.0912E+00 | 1.0270E+00 | 3.9313E+00 | −3.0202E+00 | 2.7337E−01 |
| A8 = −1.7662E+01 | 8.7562E+01 | −4.8091E+01 | 2.7115E+00 | 1.3961E+01 | −2.8671E−01 |
| A10 = 2.2628E+01 | −2.4911E+02 | 4.1658E+02 | 4.0830E+01 | −1.2014E+01 | 1.7003E−01 |
| A12 = −1.9257E+01 | −2.7066E+02 | −1.5206E+03 | −1.1475E+02 | −1.2930E+02 | 6.7191E−02 |
| A14 = −1.2755E−06 | 1.6970E−06 | −9.2820E−07 | 1.4162E−06 | 5.6920E+00 | −4.3943E−01 |
| A16 = — | — | — | — | 7.1613E+02 | 2.6438E−01 |

In the photographing lens assembly according to the 5th embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 2.14 | R3/R4 | −0.04 |
| Fno | 2.80 | R6/R5 | −0.11 |
| HFOV (deg.) | 33.0 | f/|R4| + f/|R5| | 0.17 |
| V1/V2 | 2.40 | f/f1 | 1.75 |
| CT2/CT3 | 0.38 | f2/f3 | 0.87 |
| T12/T23 | 0.12 | (f/f1) − (f/f2) − (f/f3) | 3.13 |
| SAG22/CT2 | 0.21 | | |

6th Embodiment

Figure 11:
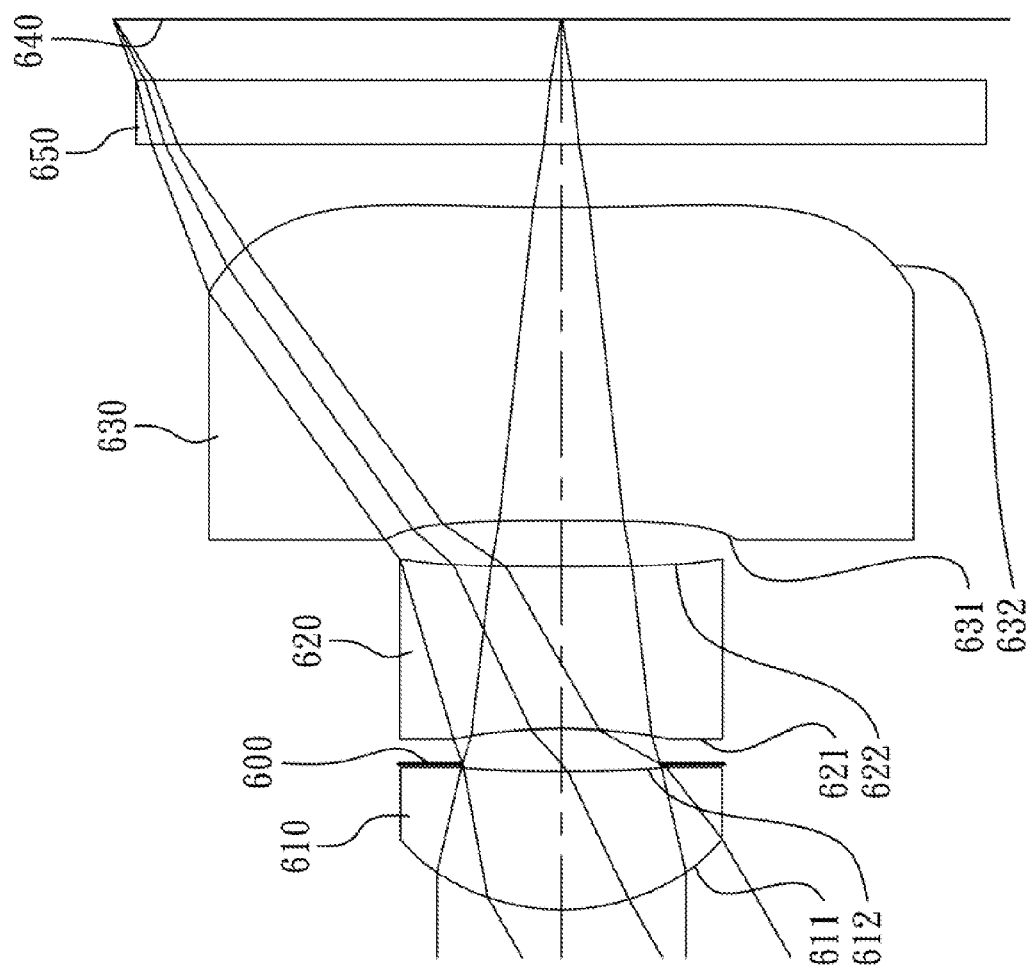
FIG. 11 is a schematic view of a photographing lens assembly according to the 6th embodiment of the present disclosure.
Figure 12:
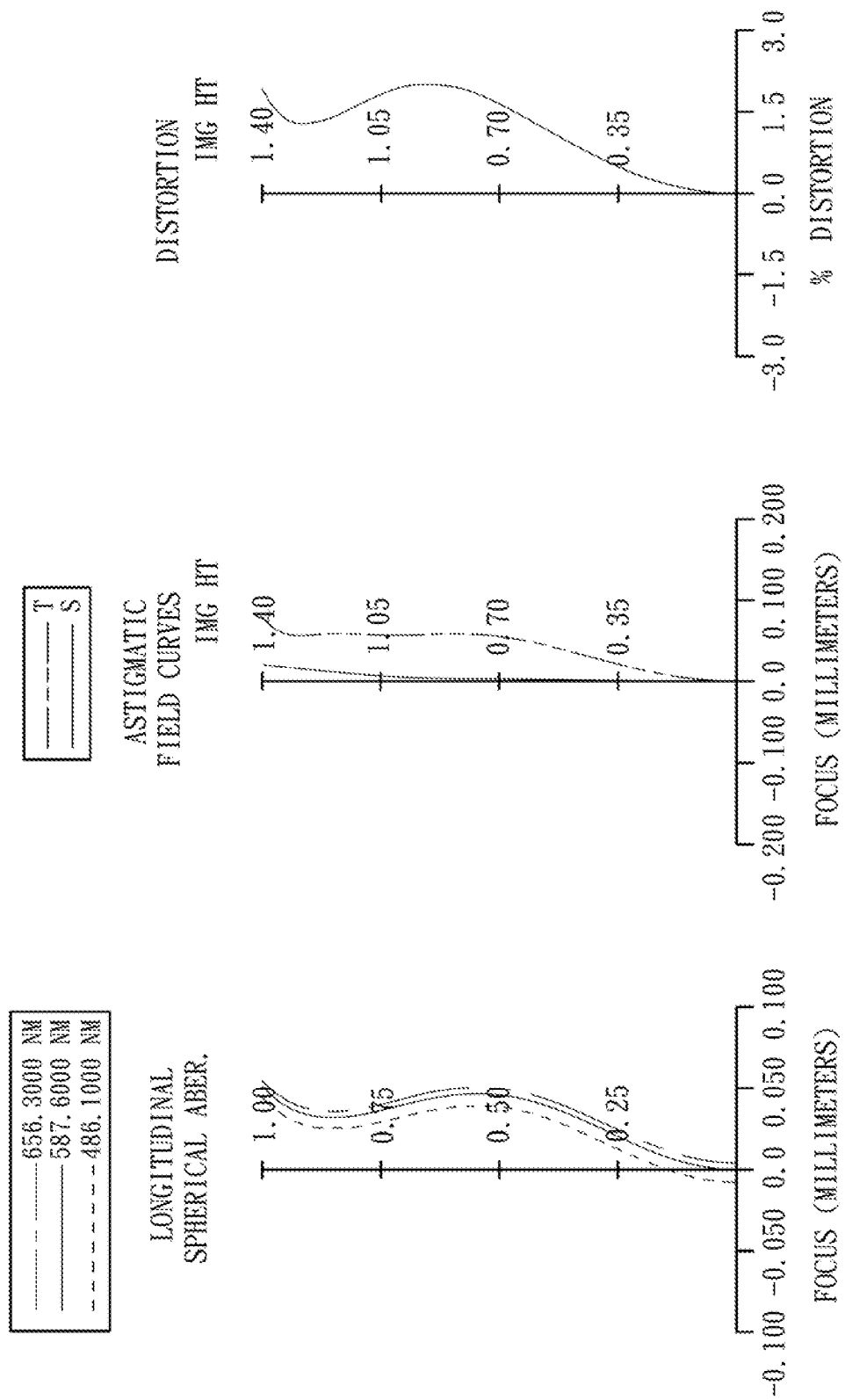
FIG. 12 shows spherical aberration curves, astigmatic field curves and a distortion curve of the photographing lens assembly according to the 6th embodiment.

FIG. 11 is a schematic view of a photographing lens assembly according to the 6th embodiment of the present disclosure. FIG. 12 shows spherical aberration curves, astigmatic field curves and a distortion curve of the photographing lens assembly according to the 6th embodiment. In FIG. 11, the photographing lens assembly includes, in order from an object side to an image side, a first lens element 610, an aperture stop 600, a second lens element 620, a third lens element 630, an IR-cut filter 650 and an image plane 640.

The first lens element 610 with positive refractive power has an object-side surface 611 being convex at a paraxial region and an image-side surface 612 being concave at a paraxial region. The first lens element 610 is made of plastic material, and has the object-side surface 611 and the image-side surface 612 being aspheric.

The second lens element 620 with negative refractive power has an object-side surface 621 being concave at a paraxial region and an image-side surface 622 being concave at a paraxial region. The second lens element 620 is made of plastic material, and has the object-side surface 621 and the image-side surface 622 being aspheric.

The third lens element 630 with negative refractive power has an object-side surface 631 being concave at a paraxial region, and an image-side surface 632 being concave at a paraxial region and being convex at a peripheral region, wherein the third lens element 630 is made of plastic material, and has the object-side surface 631 and the image-side surface 632 being aspheric.

The IR-cut filter 650 is made of glass, and located between the third lens element 630 and the image plane 640, and will not affect the focal length of the photographing lens assembly.

The detailed optical data of the 6th embodiment are shown in Table 11 and the aspheric surface data are shown in Table 12 below.

TABLE 11

6th Embodiment
f = 2.34 mm, Fno = 3.00, HFOV = 30.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 0.722 | (ASP) | 0.435 | Plastic | 1.544 | 55.9 | 1.43 |
| 2 | | 7.773 | (ASP) | 0.022 | | | | |
| 3 | Ape. Stop | Plano | | 0.110 | | | | |
| 4 | Lens 2 | −1.883 | (ASP) | 0.508 | Plastic | 1.640 | 23.3 | −2.68 |
| 5 | | 21.213 | (ASP) | 0.144 | | | | |
| 6 | Lens 3 | −100.000 | (ASP) | 0.980 | Plastic | 1.544 | 55.9 | −12.85 |
| 7 | | 7.546 | (ASP) | 0.200 | | | | |
| 8 | IR-cut filter | Plano | | 0.200 | Glass | 1.517 | 64.2 | — |
| 9 | | Plano | | 0.190 | | | | |
| 10 | Image | Plano | | — | | | | |

Note:
Reference wavelength (d-line) is 587.6 nm.

TABLE 12

Aspheric Coefficients

| Surface # | | | | | | |
|---|---|---|---|---|---|---|
| | 1 | 2 | 4 | 5 | 6 | 7 |
| k = | −7.9435E−02 | −1.6238E+01 | −2.8819E+01 | −1.0000E+00 | −1.0000E+00 | −2.1170E+01 |
| A4 = | −9.6151E−02 | 3.8576E−01 | −4.3727E−01 | 8.7719E−02 | −5.5425E−01 | −1.2229E−01 |
| A6 = | 3.1435E+00 | 8.1528E−01 | 4.9101E−01 | 1.7864E+00 | 4.4479E−01 | −2.5577E−02 |
| A8 = | −1.4301E+01 | −1.4234E+01 | −8.4982E+00 | −3.7696E+00 | −9.4161E−01 | −1.1904E−01 |
| A10 = | 3.3932E+01 | 7.2528E+01 | −1.0043E+01 | −1.0325E+01 | −1.8466E+00 | 1.1731E−01 |
| A12 = | −3.1789E−02 | −5.3673E−04 | −2.6952E+01 | 3.4745E+01 | 8.5416E−01 | −2.4475E−02 |
| A14 = | — | — | — | — | −1.3142E+01 | −3.6674E−02 |
| A16 = | — | — | — | — | −5.8522E+01 | 1.2697E−02 |

In the photographing lens assembly according to the 6th embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 6th embodiment. Moreover, these parameters can be calculated from Table 11 and Table 12 as the following values and satisfy the following relationships:

| f (mm) | 2.34 | R3/R4 | −0.09 |
|---|---|---|---|
| Fno | 3.00 | R6/R5 | −0.08 |
| HFOV (deg.) | 30.1 | f/|R4| + f/|R5| | 0.13 |
| V1/V2 | 2.40 | f/f1 | 1.63 |
| CT2/CT3 | 0.52 | f2/f3 | 0.21 |
| T12/T23 | 0.92 | (f/f1) − (f/f2) − (f/f3) | 2.69 |
| SAG22/CT2 | 0.05 | | |

7th Embodiment

Figure 13:
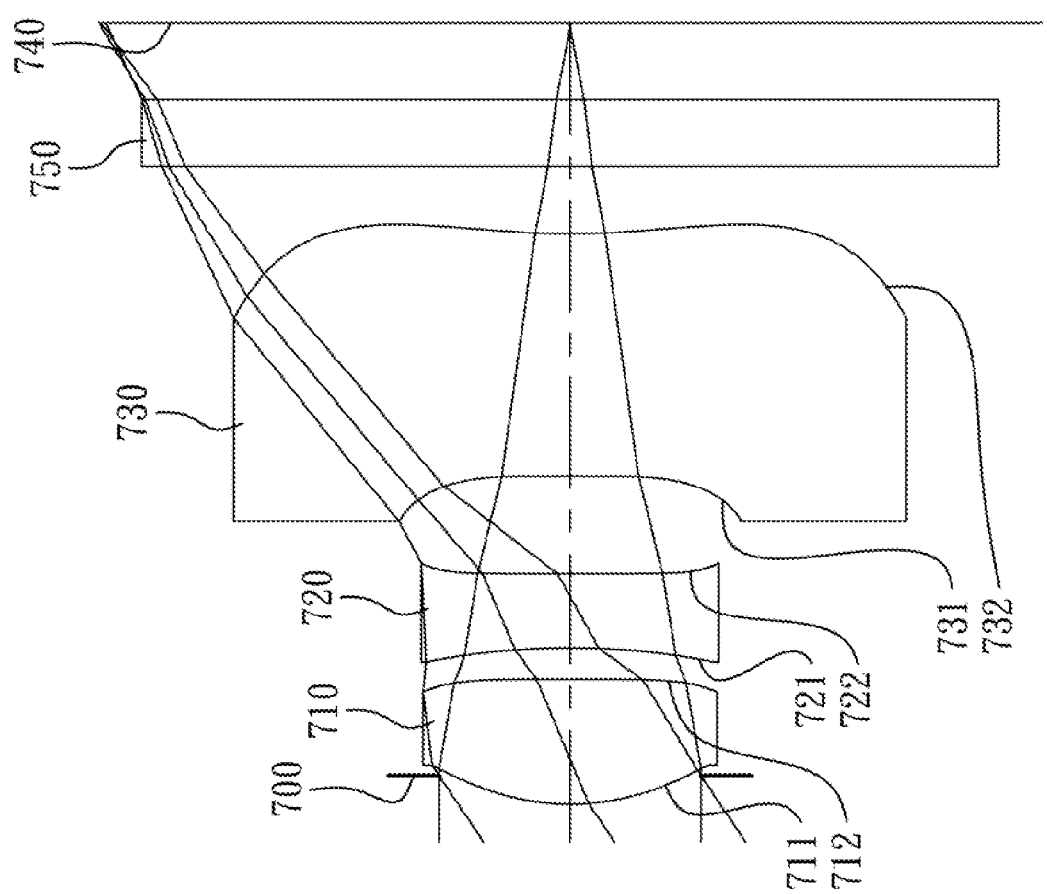
FIG. 13 is a schematic view of a photographing lens assembly according to the 7th embodiment of the present disclosure.
Figure 14:
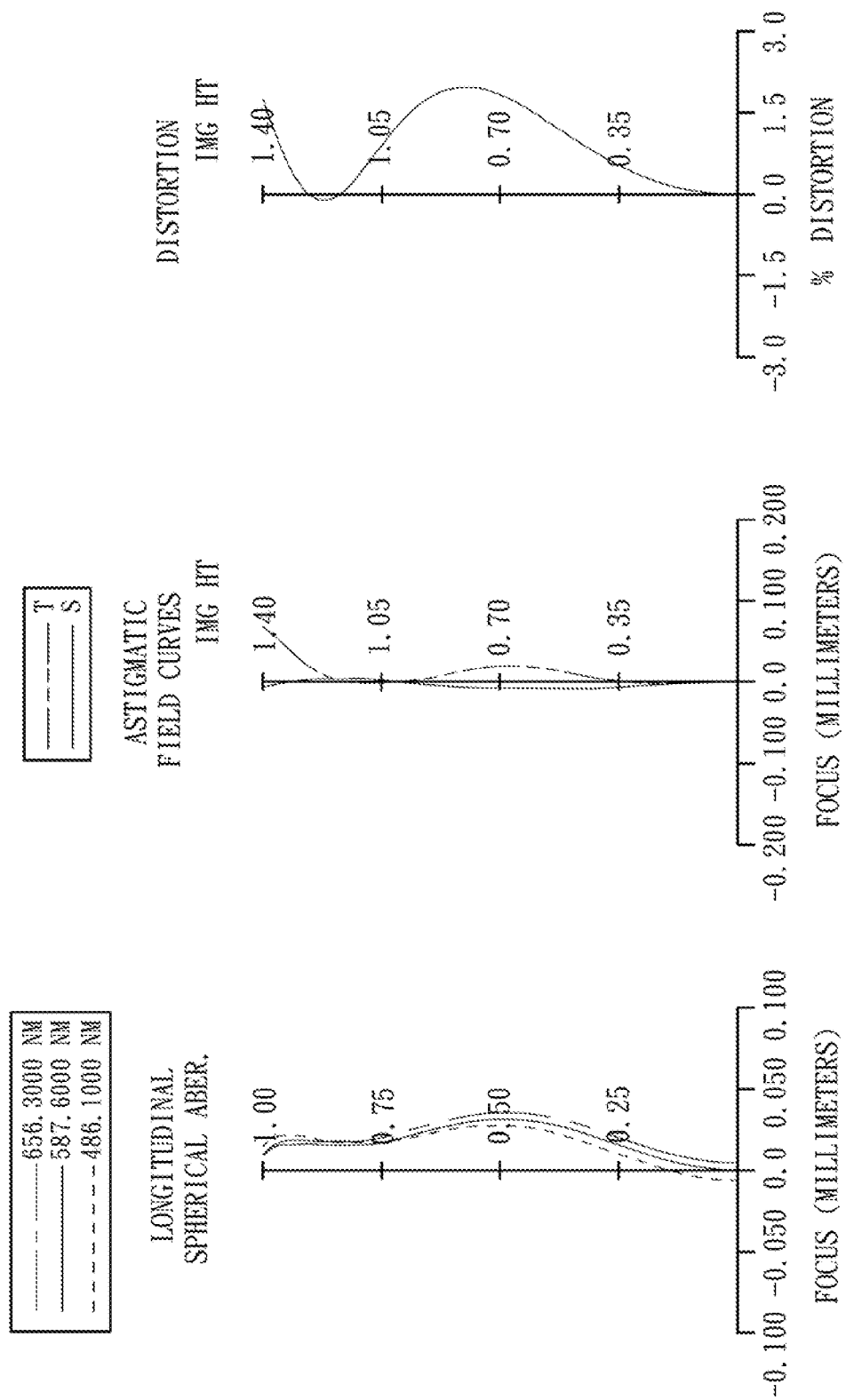
FIG. 14 shows spherical aberration curves, astigmatic field curves and a distortion curve of the photographing lens assembly according to the 7th embodiment.

FIG. 13 is a schematic view of a photographing lens assembly according to the 7th embodiment of the present disclosure. FIG. 14 shows spherical aberration curves, astigmatic field curves and a distortion curve of the photographing lens assembly according to the 7th embodiment. In FIG. 13, the photographing lens assembly includes, in order from an object side to an image side, an aperture stop 700, a first lens element 710, a second lens element 720, a third lens element 730, an IR-cut filter 750 and an image plane 740.

The first lens element 710 with positive refractive power has an object-side surface 711 being convex at a paraxial region and an image-side surface 712 being concave at a paraxial region. The first lens element 710 is made of glass material, and has the object-side surface 711 and the image-side surface 712 being aspheric.

The second lens element 720 with negative refractive power has an object-side surface 721 being concave at a paraxial region and an image-side surface 722 being concave at a paraxial region. The second lens element 720 is made of plastic material, and has the object-side surface 721 and the image-side surface 722 being aspheric.

The third lens element 730 with negative refractive power has an object-side surface 731 being concave at a paraxial region, and an image-side surface 732 being concave at a paraxial region and being convex at a peripheral region, wherein the third lens element 730 is made of plastic material, and has the object-side surface 731 and the image-side surface 732 being aspheric.

The IR-cut filter 750 is made of glass, and located between the third lens element 730 and the image plane 740, and will not affect the focal length of the photographing lens assembly.

The detailed optical data of the 7th embodiment are shown in Table 13 and the aspheric surface data are shown in Table 14 below.

TABLE 13

7th Embodiment
f = 2.06 mm, Fno = 2.65, HFOV = 33.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.085 | | | | |
| 2 | Lens 1 | 0.726 | (ASP) | 0.371 | Glass | 1.542 | 62.9 | 1.36 |
| 3 | | 34.877 | (ASP) | 0.091 | | | | |
| 4 | Lens 2 | −2.915 | (ASP) | 0.223 | Plastic | 1.650 | 21.4 | −4.22 |
| 5 | | 47.170 | (ASP) | 0.291 | | | | |
| 6 | Lens 3 | −25.718 | (ASP) | 0.720 | Plastic | 1.544 | 55.9 | −3.88 |
| 7 | | 2.320 | (ASP) | 0.200 | | | | |
| 8 | IR-cut filter | Plano | | 0.200 | Glass | 1.517 | 64.2 | — |
| 9 | | Plano | | 0.227 | | | | |
| 10 | Image | Plane | | — | | | | |

Note:
Reference wavelength (d-line) is 587.6 nm.

TABLE 14

Aspheric Coefficients

| | Surface # | | | | | |
|---|---|---|---|---|---|---|
| | 2 | 3 | 4 | 5 | 6 | 7 |
| k = | −3.0110E−01 | 3.0000E+00 | 3.0000E+00 | −1.0000E+00 | −1.0000E+00 | −1.2294E+01 |
| A4 = | −1.7816E−01 | −6.9718E−01 | −8.0776E−01 | −1.9274E−01 | −1.1958E+00 | −3.4054E−01 |
| A6 = | 1.5867E+00 | −4.0742E+00 | 3.9154E+00 | 3.0948E+00 | −3.6069E+00 | 6.5389E−02 |
| A8 = | −1.4491E+01 | 2.8152E+01 | −1.7817E+01 | 2.4580E+00 | 2.4086E+01 | −1.3654E−01 |
| A10 = | 3.6402E+01 | −6.3941E+01 | 2.3242E+02 | 6.5766E+01 | −1.0668E+02 | 8.0445E−02 |
| A12 = | −1.2268E+02 | −1.8618E+02 | −8.8822E+02 | −1.4815E+02 | 1.6781E+02 | −7.9537E−02 |
| A14 = | — | — | — | — | −4.7996E+02 | −4.8011E−02 |
| A16 = | — | — | — | — | 6.6173E+02 | 5.0241E−02 |

In the photographing lens assembly according to the 7th embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 7th embodiment. Moreover, these parameters can be calculated from Table 13 and Table 14 as the following values and satisfy the following relationships:

| | | | | |
|---|---|---|---|---|
| f (mm) | 2.06 | R3/R4 | | −0.06 |
| Fno | 2.65 | R6/R5 | | −0.09 |
| HFOV (deg.) | 33.4 | f/\|R4\| + f/\|R5\| | | 0.12 |
| V1/V2 | 2.94 | f/f1 | | 1.51 |
| CT2/CT3 | 0.31 | f2/f3 | | 1.09 |
| T12/T23 | 0.31 | (f/f1) − (f/f2) − (f/f3) | | 3.89 |
| SAG22/CT2 | 0.14 | | | |

8th Embodiment

Figure 15:
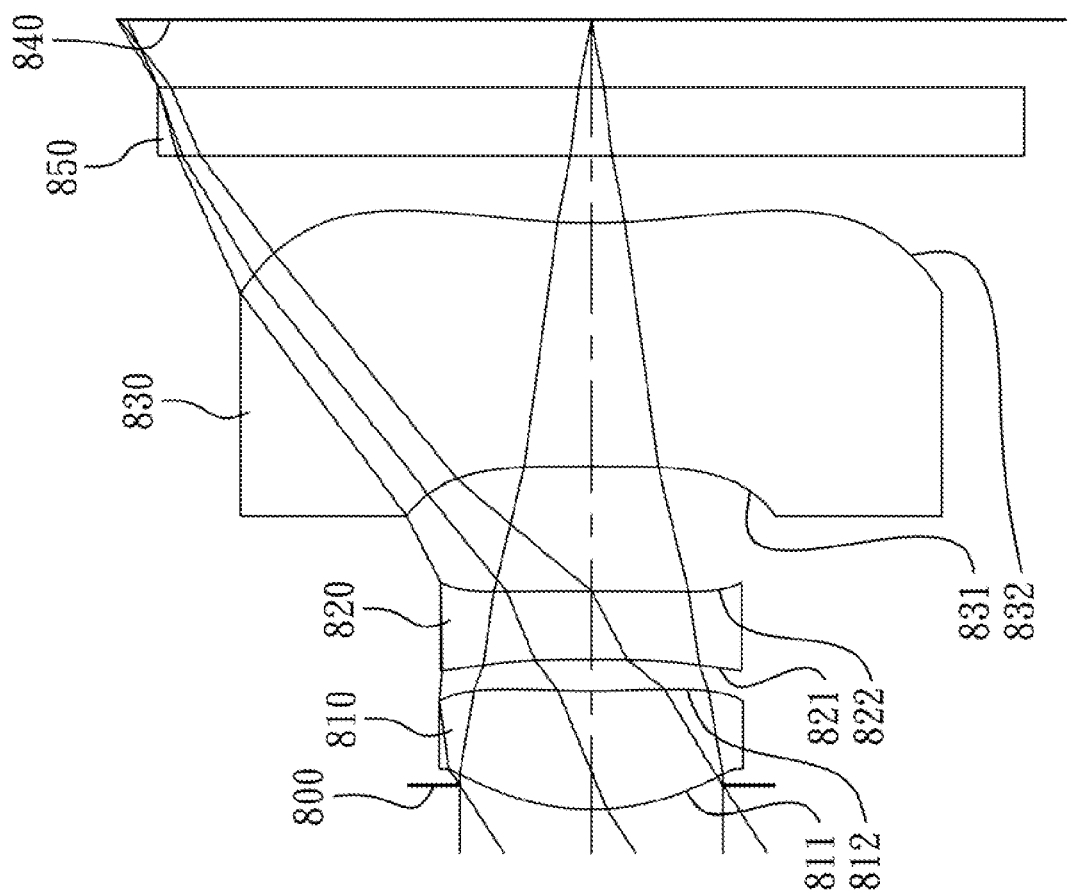
FIG. 15 is a schematic view of a photographing lens assembly according to the 8th embodiment of the present disclosure.
Figure 16:
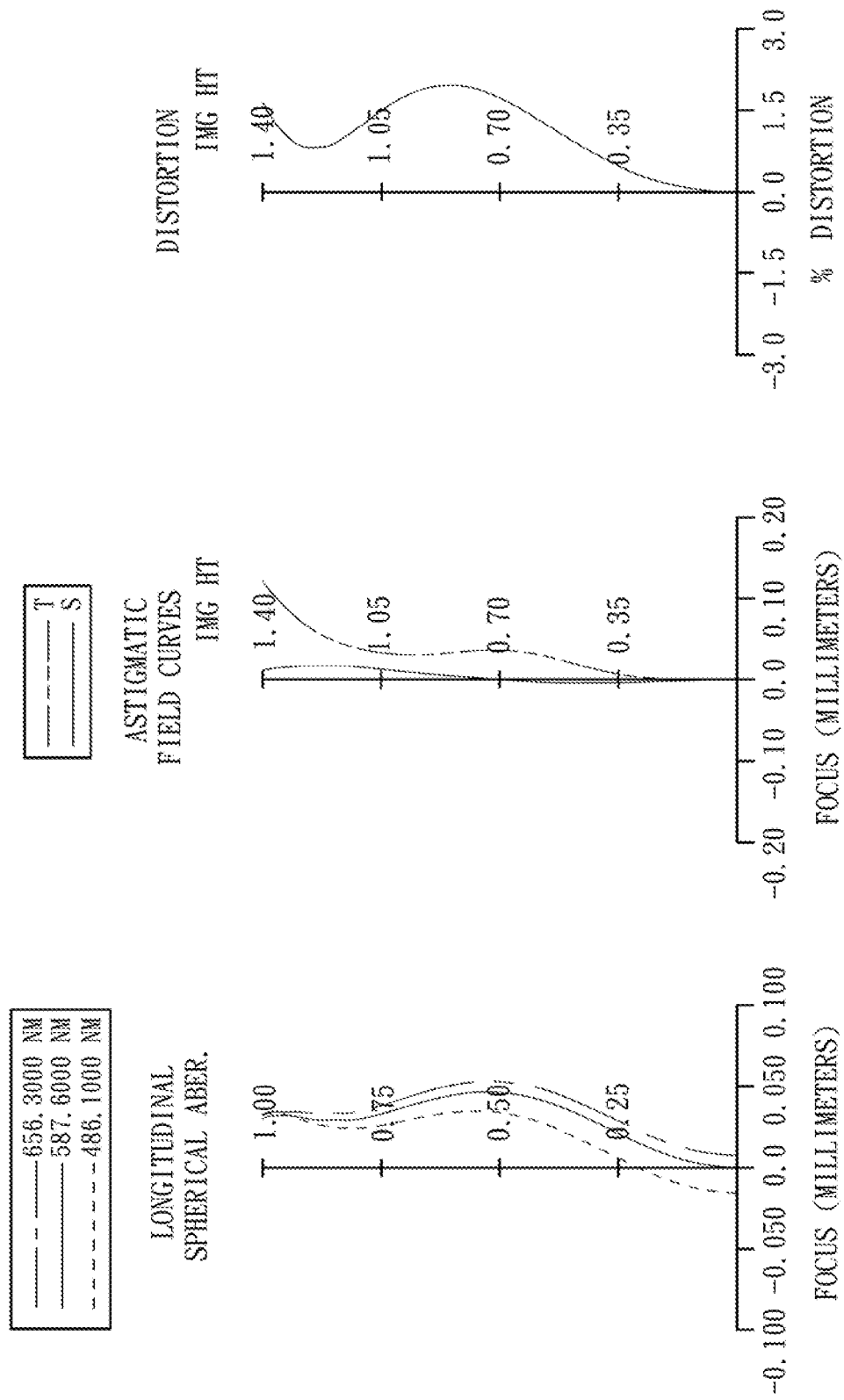
FIG. 16 shows spherical aberration curves, astigmatic field curves and a distortion curve of the photographing lens assembly according to the 8th embodiment.

FIG. 15 is a schematic view of a photographing lens assembly according to the 8th embodiment of the present disclosure. FIG. 16 shows spherical aberration curves, astigmatic field curves and a distortion curve of the photographing lens assembly according to the 8th embodiment. In FIG. 15, the photographing lens assembly includes, in order from an object side to an image side, an aperture stop 800, a first lens element 810, a second lens element 820, a third lens element 830, an IR-cut filter 850 and an image plane 840.

The first lens element 810 with positive refractive power has an object-side surface 811 being convex at a paraxial region and an image-side surface 812 being concave at a paraxial region. The first lens element 810 is made of glass material, and has the object-side surface 811 and the image-side surface 812 being aspheric.

The second lens element 820 with negative refractive power has an object-side surface 821 being concave at a paraxial region and an image-side surface 822 being planar at a paraxial region. The second lens element 820 is made of plastic material, and has the object-side surface 821 and the image-side surface 822 being aspheric.

The third lens element 830 with negative refractive power has an object-side surface 831 being concave at a paraxial region, and an image-side surface 832 being concave at a paraxial region and being convex at a peripheral region, wherein the third lens element 830 is made of plastic material, and has the object-side surface 831 and the image-side surface 832 being aspheric.

The IR-cut filter 850 is made of glass, and located between the third lens element 830 and the image plane 840, and will not affect the focal length of the photographing lens assembly.

The detailed optical data of the 8th embodiment are shown in Table 15 and the aspheric surface data are shown in Table 16 below.

TABLE 15

8th Embodiment
f = 2.06 mm, Fno = 2.65, HFOV = 33.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.071 | | | | |
| 2 | Lens 1 | 0.730 | (ASP) | 0.352 | Glass | 1.542 | 62.9 | 1.65 |
| 3 | | 3.299 | (ASP) | 0.092 | | | | |
| 4 | Lens 2 | −10.877 | (ASP) | 0.200 | Plastic | 1.650 | 21.4 | −16.74 |
| 5 | | ∞ | (ASP) | 0.369 | | | | |
| 6 | Lens 3 | −26.455 | (ASP) | 0.720 | Plastic | 1.544 | 55.9 | −3.44 |
| 7 | | 2.035 | (ASP) | 0.200 | | | | |
| 8 | IR-cut filter | Plano | | 0.200 | Glass | 1.517 | 64.2 | |
| 9 | | Plano | | 0.202 | | | | |
| 10 | Image | Plano | | — | | | | |

Note:
Reference wavelength (d-line) is 587.6 nm.

TABLE 16

Aspheric Coefficients

| | Surface # | | | | | |
|---|---|---|---|---|---|---|
| | 2 | 3 | 4 | 5 | 6 | 7 |
| k = | −4.4223E−01 | −2.6268E+01 | 1.0110E+01 | −1.0000E+00 | −1.0000E+00 | −4.9918E+00 |
| A4 = | −1.4804E−01 | −8.8980E−01 | −1.5531E+00 | −5.2522E−01 | −1.0860E+00 | −4.1230E−01 |
| A6 = | 1.4145E+00 | −5.9142E+00 | 4.1683E+00 | 3.2099E+00 | −3.0205E+00 | 1.9810E−01 |
| A8 = | −1.2323E+01 | 3.5046E+01 | −1.5265E+01 | 8.1121E+00 | 2.1885E+01 | −1.5163E−01 |
| A10 = | 2.8868E+01 | −5.6498E+01 | 2.6562E+02 | 6.4975E+01 | −9.2143E+01 | 2.5241E−02 |
| A12 = | −1.2268E+02 | −1.8618E+02 | −8.8822E+02 | −1.4815E+02 | 1.9158E+02 | −4.9244E−02 |
| A14 = | — | — | — | — | −4.5509E+02 | 3.2158E−02 |
| A16 = | — | — | — | — | 6.4847E+02 | −4.6092E−03 |

In the photographing lens assembly according to the 8th embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 8th embodiment. Moreover, these parameters can be calculated from Table 15 and Table 16 as the following values and satisfy the following relationships:

| f (mm) | 2.06 | R3/R4 | 0.00 |
|---|---|---|---|
| Fno | 2.65 | R6/R5 | −0.08 |
| HFOV (deg.) | 33.4 | f/|R4| + f/|R5| | 0.08 |
| V1/V2 | 2.94 | f/f1 | 1.25 |
| CT2/CT3 | 0.28 | f2/f3 | 4.86 |
| T12/T23 | 0.25 | (f/f1) − (f/f2) − (f/f3) | 1.97 |
| SAG22/CT2 | 0.14 | | |

9th Embodiment

Figure 17:
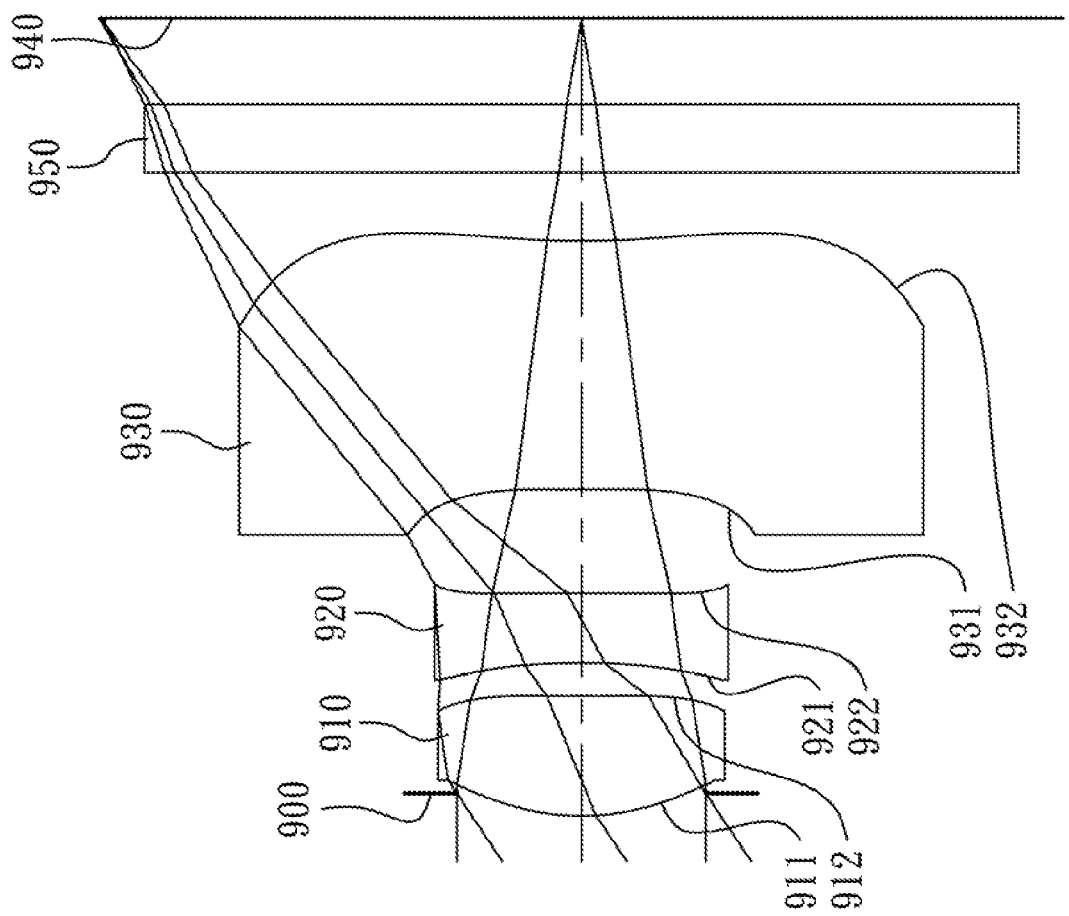
FIG. 17 is a schematic view of a photographing lens assembly according to the 9th embodiment of the present disclosure.
Figure 18:
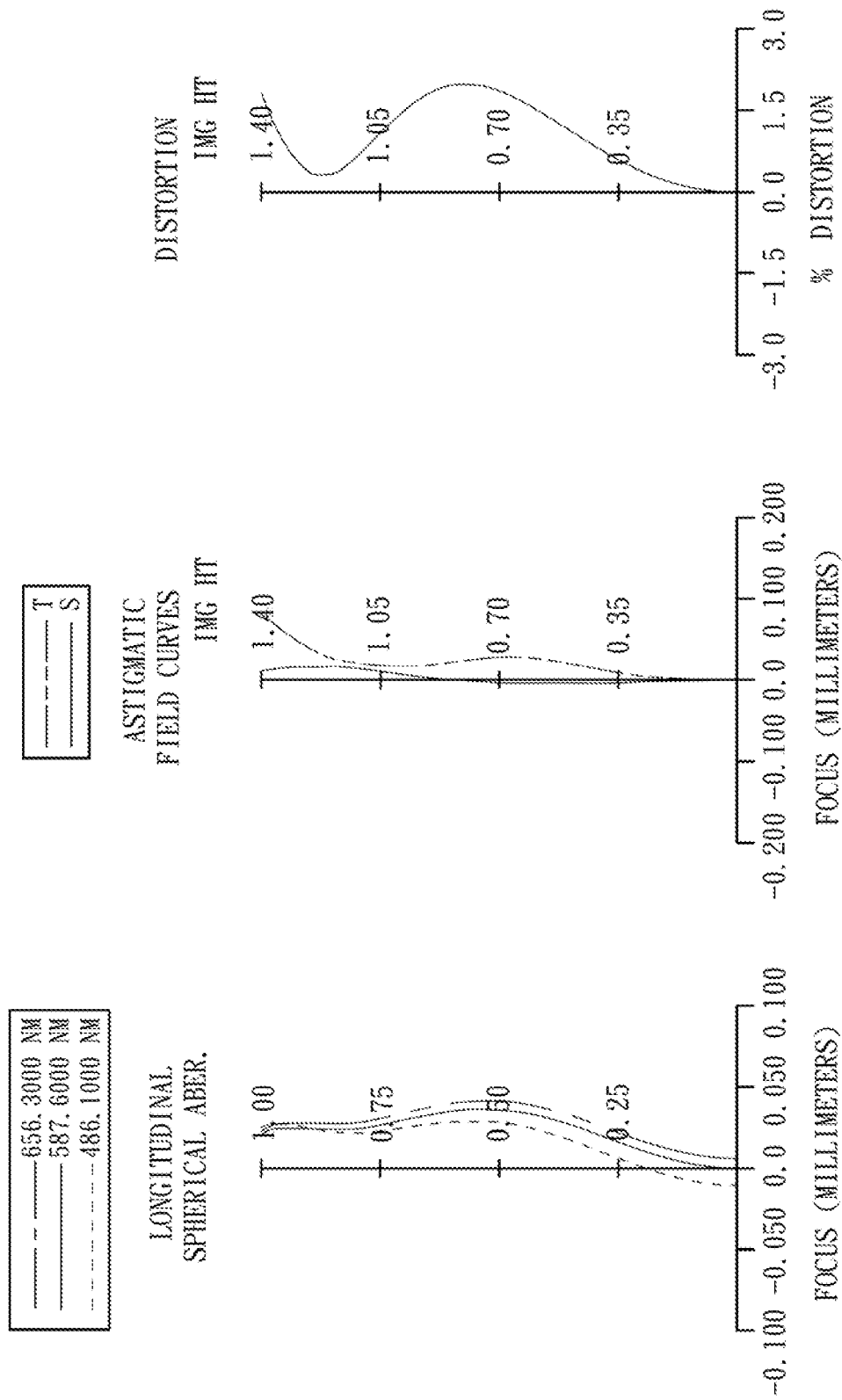
FIG. 18 shows spherical aberration curves, astigmatic field curves and a distortion curve of the photographing lens assembly according to the 9th embodiment.

FIG. 17 is a schematic view of a photographing lens assembly according to the 9th embodiment of the present disclosure. FIG. 18 shows spherical aberration curves, astigmatic field curves and a distortion curve of the photographing lens assembly according to the 9th embodiment. In FIG. 17, the photographing lens assembly includes, in order from an object side to an image side, an aperture stop 900, a first lens element 910, a second lens element 920, a third lens element 930, an IR-cut filter 950 and an image plane 940.

The first lens element 910 with positive refractive power has an object-side surface 911 being convex at a paraxial region and an image-side surface 912 being concave at a paraxial region. The first lens element 910 is made of plastic material, and has the object-side surface 911 and the image-side surface 912 being aspheric.

The second lens element 920 with negative refractive power has an object-side surface 921 being concave at a paraxial region and an image-side surface 922 being planar at a paraxial region. The second lens element 920 is made of plastic material, and has the object-side surface 921 and the image-side surface 922 being aspheric.

The third lens element 930 with negative refractive power has an object-side surface 931 being concave at a paraxial region, and an image-side surface 932 being concave at a paraxial region and being convex at a peripheral region, wherein the third lens element 930 is made of plastic material, and has the object-side surface 931 and the image-side surface 932 being aspheric.

The IR-cut filter 950 is made of glass, and located between the third lens element 930 and the image plane 940, and will not affect the focal length of the photographing lens assembly.

The detailed optical data of the 9th embodiment are shown in Table 17 and the aspheric surface data are shown in Table 18 below.

TABLE 17

9th Embodiment
f = 2.06 mm, Fno = 2.85, HFOV = 33.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.065 | | | | |
| 2 | Lens 1 | 0.713 | (ASP) | 0.348 | Plastic | 1.544 | 55.9 | 1.36 |
| 3 | | 17.913 | (ASP) | 0.094 | | | | |
| 4 | Lens 2 | −2.701 | (ASP) | 0.204 | Plastic | 1.650 | 21.4 | −4.16 |
| 5 | | ∞ | (ASP) | 0.302 | | | | |
| 6 | Lens 3 | −26.455 | (ASP) | 0.720 | Plastic | 1.544 | 55.9 | −4.14 |
| 7 | | 2.485 | (ASP) | 0.200 | | | | |
| 8 | IR-cut filter | Plano | | 0.200 | Glass | 1.517 | 64.2 | |
| 9 | | Plano | | 0.249 | | | | |
| 10 | Image | Plano | | — | | | | |

Note:
Reference wavelength (d-line) is 587.6 nm.

TABLE 18

Aspheric Coefficients

| | Surface # | | | | | |
|---|---|---|---|---|---|---|
| | 2 | 3 | 4 | 5 | 6 | 7 |
| k = | −3.9970E−01 | −3.0000E+01 | −2.6581E+01 | −1.0000E+00 | −1.0000E+00 | −3.9061E−01 |
| A4 = | −1.4933E−01 | −1.0022E+00 | −1.5624E+00 | −4.3331E−01 | −1.3087E+00 | −4.4343E−01 |
| A6 = | 1.3064E+00 | −6.4357E+00 | 4.6415E+00 | 4.0499E+00 | −2.4324E+00 | 1.1347E−01 |
| A8 = | −1.5624E+01 | 3.6118E+01 | −1.2439E+01 | 6.1344E+00 | 1.6875E+01 | −1.1546E−01 |
| A10 = | 1.7483E+01 | −7.7136E+01 | 2.3549E+02 | 7.0603E+01 | −9.4124E+01 | 1.0894E−02 |
| A12 = | −1.2213E+02 | −1.8695E+02 | −8.8752E+02 | −1.4776E+02 | 1.8086E+02 | −3.5398E−02 |
| A14 = | | | | | −4.9764E+02 | −1.6754E−02 |
| A16 = | | | | | 6.1350E+02 | 1.9255E−02 |

In the photographing lens assembly according to the 9th embodiment, the definitions of f, Fno, HFOV, V1, V2, CT2, CT3, T12, T23, SAG22, R3, R4, R5, R6, f1, f2 and f3 are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 2.06 | R3/R4 | 0.00 |
| Fno | 2.85 | R6/R5 | −0.09 |
| HFOV (deg.) | 33.4 | f/|R4| + f/|R5| | 0.08 |
| V1/V2 | 2.61 | f/f1 | 1.52 |
| CT2/CT3 | 0.28 | f2/f3 | 1.00 |
| T12/T23 | 0.31 | (f/f1) − (f/f2) − (f/f3) | 2.51 |
| SAG22/CT2 | 0.12 | | |

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A photographing lens assembly comprising, in order from an object side to an image side:
    a first lens element with positive refractive power having an object-side surface being convex at a paraxial region;
    a second lens element with negative refractive power having an object-side surface being concave at a paraxial region and an image-side surface being concave or planar at a paraxial region, wherein the second lens element is made of plastic material and the object-side surface and the image-side surface of the second lens element are aspheric; and
    a third lens element with negative refractive power having an object-side surface being concave at a paraxial region, and an image-side surface being concave at a paraxial region and being convex at a peripheral region, wherein the third lens element is made of plastic material, and the object-side surface and the image-side surface of the third lens element are aspheric;
    wherein the photographing lens assembly has a total of three lens elements with refractive power; a distance in parallel with an optical axis from a maximum effective diameter position on the image-side surface of the second lens element to an axial vertex on the image-side surface of the second lens element is SAG22, a central thickness of the second lens element is CT2, and the following relationship is satisfied:

$0 < SAG22/CT2 < 0.40.$

2. The photographing lens assembly of claim 1, wherein an Abbe number of the first lens element is V1, an Abbe number of the second lens element is V2, and the following relationship is satisfied:

$1.5 < V1/V2 < 3.5.$

3. The photographing lens assembly of claim 1, wherein a focal length of the second lens element is f2, a focal length of the third lens element is f3, and the following relationship is satisfied:

$0 < f2/f3 < 1.20.$

4. The photographing lens assembly of claim 3, wherein a curvature radius of the object-side surface of the second lens element is R3, a curvature radius of the image-side surface of the second lens element is R4, and the following relationship is satisfied:

$-1.5 < R3/R4 \leq 0.$

5. The photographing lens assembly of claim 1, wherein a curvature radius of the object-side surface of the second lens element is R3, a curvature radius of the image-side surface of the second lens element is R4, and the following relationship is satisfied:

$-0.35 < R3/R4 \leq 0.$

6. The photographing lens assembly of claim wherein a curvature radius of the object-side surface of the third lens element is R5, a curvature radius of the image-side surface of the third lens element is R6, and the following relationship is satisfied:

$-0.35 < R6/R5 < 0.$

7. The photographing fens assembly of claim 1, wherein a focal length of the photographing lens assembly is f, a curvature radius of the image-side surface of the second lens element is R4, a curvature radius of the object-side surface of the third lens element is R5, and the following relationship is satisfied:

$0 < f/|R4| + f/|R5| < 0.80.$

8. The photographing lens assembly of claim 1, wherein a focal length of the photographing lens assembly is f, a curvature radius of the image-side surface of the second lens element is R4, a curvature radius of the object-side surface of the third lens element is R5, and the following relationship is satisfied:

$0 < f/|R4| + f/|R5| < 0.50.$

9. The photographing lens assembly of claim 1, wherein a focal length of the photographing lens assembly is f, a focal length of the first lens element is f1, and the following relationship is satisfied:

$1.20 < f/f1 < 2.00.$

10. The photographing lens assembly of claim 1, wherein a focal length of the photographing lens assembly is f, a focal length of the first lens element is f1, and the following relationship is satisfied:

$1.40 < f/f1 < 1.80.$

11. The photographing lens assembly of claim 1, wherein a focal length of the photographing lens assembly is f, a focal length of the first lens element is f1, a focal length of the second lens element is f2, a focal length of the third lens element is f3, and the following relationship is satisfied:

$1.85 < (f/f1) - (f/f2) - (f/f3) < 3.50.$

12. The photographing lens assembly of claim 1, wherein a central thickness of the second lens element is CT2, a central thickness of the third lens element is CT3, and the following relationship is satisfied:

$0.10 < CT2/CT3 < 0.60.$

13. The photographing lens assembly of claim 1, wherein an axial distance between the first lens element and the second lens element is T12, an axial distance between the second lens element and the third lens element is T23, and the following relationship is satisfied:

$0.05 < T12/T23 < 0.70.$

14. A photographing lens assembly comprising, in order from an object side to an image side:
    a first lens element with positive refractive power having an object-side surface being convex at a paraxial region;
    a second lens element with negative refractive power having an object-side surface being concave at a paraxial region and an image-side surface being concave or planar at a paraxial region, wherein the second lens ent is made of plastic material, and the object-side surface and the image-side surface of the second lens element are aspheric; and a third lens element with negative refractive power having an object-side surface being concave at a paraxial region, and an image-side surface being concave at a paraxial region and being convex at a peripheral region, wherein the third lens element is made of plastic material, and the object-side surface and the image-side surface of the third lens element are aspheric;

wherein the photographing lens assembly has a total of three lens elements with refractive power; a curvature radius of the object-side surface of the second lens element R3, a curvature radius of the image-side surface of the second lens element is R4, a curvature radius of the object-side surface of the third lens element is R5, a curvature radius of the image-side surface of the third lens element is R6, a focal length of the photographing lens assembly is f, and the following relationships are satisfied:

$-1.5 < R3/R4 \leq 0$;

$-0.5 < R6/R5 < 0$; and $0 < f/|R4| + f/|R5| < 0.80$.

15. The photographing lens assembly of claim 14, wherein an Abbe number of the first lens element is V1, an Abbe number of the second lens element is V2, and the following relationship is satisfied:

$1.5 < V1/V2 < 3.5$.

16. The photographing lens assembly of claim 14, wherein focal length of the second lens element is f2, a focal length of the third lens element is f3, and the following relationship is satisfied:

$0 < f2/f3 < 1.20$.

17. The photographing lens assembly of claim 14, wherein the curvature radius of the object-side surface of the second lens element is R3, the curvature radius of the image-side surface of the second lens element is R4, and the following relationship is satisfied:

$-0.35 < R3/R4 \leq 0$.

18. The photographing lens assembly of claim 14, wherein the focal length of the photographing lens assembly is f, a focal length of the first lens element is f1, and the following relationship is satisfied:

$1.20 < f/f1 < 2.00$.

19. The photographing lens assembly of claim 14, wherein the focal length of the photographing lens assembly is f, a focal length of the first lens element is f1, a focal length of the second lens element is f2, a focal length of the third lens element is f3, and the following relationship is satisfied:

$1.85 < (f/f1) - (f/f2) - (f/f3) < 3.50$.

20. The photographing lens assembly of claim 14, wherein a central thickness of the second lens element is CT2, a central thickness of the third lens element is CT3, and the following relationship is satisfied:

$0.10 < CT2/CT3 < 0.60$.

21. The photographing lens assembly of claim 14, wherein an axial distance between the first lens element and the second lens element is T12, an axial distance between the second lens element and the third lens element is T23, and the following relationship is satisfied:

$0.05 < T12/T23 < 0.70$.

22. The photographing lens assembly of claim 14, wherein a distance in parallel with an optical axis from a maximum effective diameter position on the image-side surface of the second lens element to an axial vertex on the image-side surface of the second lens element is SAG22, a central thickness of the second lens element is CT2, and the following relationship is satisfied:

$0 < SAG22/CT2 < 0.40$.

* * * * *